(12) United States Patent
Sumi

(10) Patent No.: US 7,851,738 B2
(45) Date of Patent: Dec. 14, 2010

(54) DRIVER CIRCUIT, RELATED DRIVE CONTROL METHOD AND IMAGE READING APPARATUS

(75) Inventor: Shinobu Sumi, Tama (JP)

(73) Assignee: Casio Computer Co., Ltd., Tokyo (JP)

( * ) Notice: Subject to any disclaimer, the term of this patent is extended or adjusted under 35 U.S.C. 154(b) by 1355 days.

(21) Appl. No.: 11/318,887

(22) Filed: Dec. 27, 2005

(65) Prior Publication Data

US 2006/0140076 A1 Jun. 29, 2006

(30) Foreign Application Priority Data

Dec. 28, 2004 (JP) .............................. 2004-380380

(51) Int. Cl.
H04N 5/228 (2006.01)
H04N 3/14 (2006.01)
H01L 27/00 (2006.01)

(52) U.S. Cl. ............................. 250/208.1; 250/214 A; 348/300; 348/312

(58) Field of Classification Search .............. 250/208.1, 250/214 A; 348/300, 308, 310, 312
See application file for complete search history.

(56) References Cited

U.S. PATENT DOCUMENTS

| 5,268,764 | A | * | 12/1993 | Kihara et al. | ............... | 348/245 |
| 5,933,189 | A | * | 8/1999 | Nomura | ....................... | 348/302 |
| 6,166,769 | A | * | 12/2000 | Yonemoto et al. | .......... | 348/308 |
| 6,590,611 | B1 | * | 7/2003 | Ishida et al. | ................ | 348/310 |
| 6,791,613 | B2 | * | 9/2004 | Shinohara et al. | .......... | 348/308 |
| 7,030,915 | B2 | * | 4/2006 | Sakuragi | ..................... | 348/241 |
| 7,268,331 | B2 | * | 9/2007 | Koyama | .................. | 250/208.1 |

FOREIGN PATENT DOCUMENTS

| JP | 4-177984 A | 6/1992 |
| JP | 4-335758 A | 11/1992 |
| JP | 5-308468 A | 11/1993 |
| JP | 6-315085 A | 11/1994 |
| JP | 10-136152 A | 5/1998 |
| JP | 2001-189828 A | 7/2001 |

OTHER PUBLICATIONS

Japanese Office Action dated Mar. 11, 2008 (3 pages), and English translation thereof (3 pages), issued in counterpart Japanese Application Serial No. 2004-380380.
Japanese Office Action dated Aug. 18, 2008 (2 pages), and English translation thereof (2 pages), issued in counterpart Japanese Application Serial No. 2004-380380.

* cited by examiner

Primary Examiner—John R Lee
(74) Attorney, Agent, or Firm—Holtz, Holtz, Goodman & Chick, PC

(57) ABSTRACT

A driver circuit provided with a shift signal generator for sequentially outputting shift signals at a predetermined time interval; a plurality of amplifiers respectively receiving a plurality of detection signals read out in parallel corresponding to a detectable object image pattern and respectively receiving the shift signals, wherein the plurality of amplifiers respectively amplify and output the detection signals inputted thereto based on the output timing of each of the shift signals inputted thereto; a data converter for outputting in time series each of the amplified detection signals outputted from each of the amplifiers based on the output timing of each of the shift signals and for generating time series read data. Power consumption and the amount of heat generation are suppressed in the driver circuit provided with means to individually control a supply state of electrical current to each of the amplifiers.

21 Claims, 17 Drawing Sheets

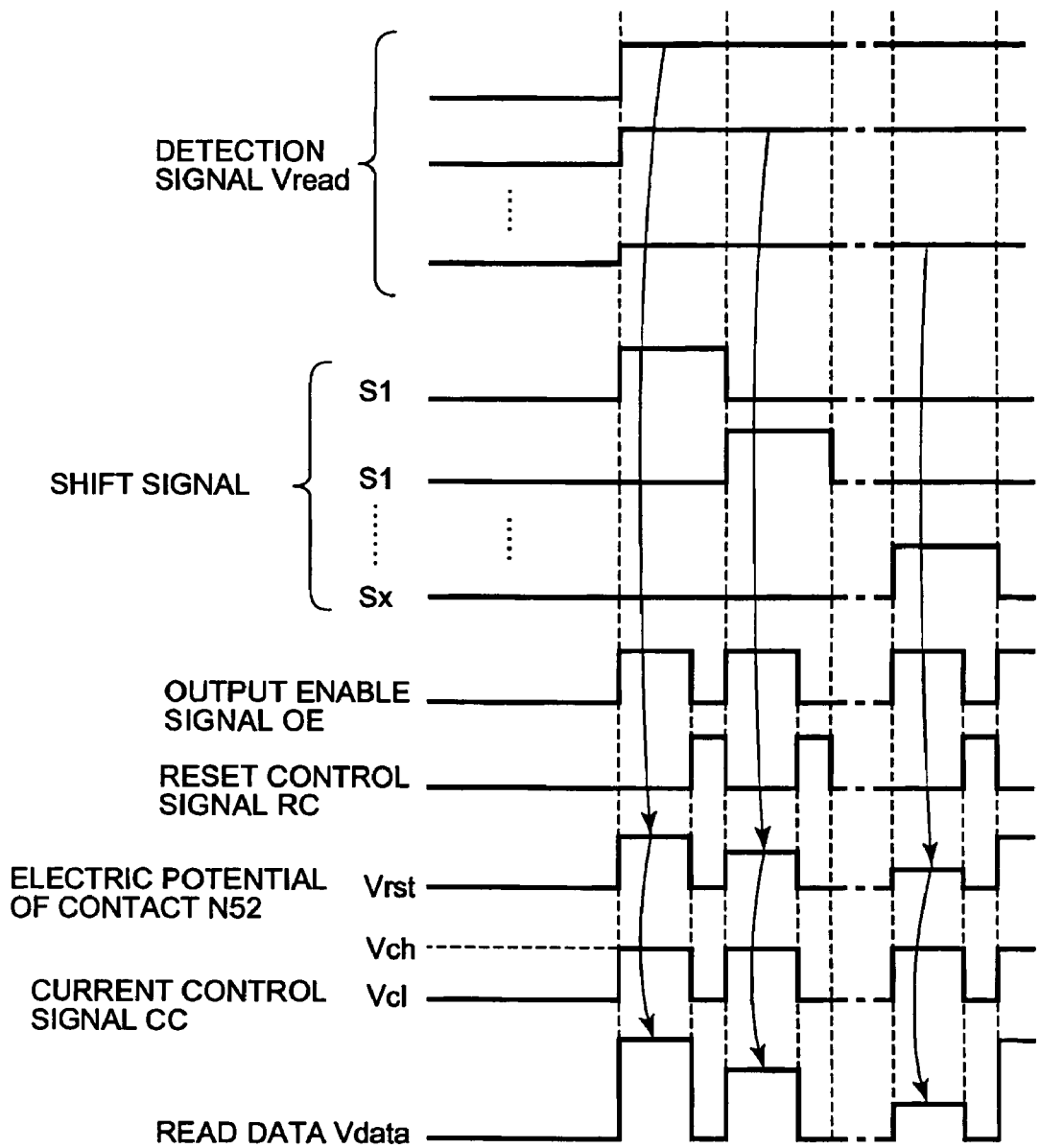

PRIOR ART

DRIVER CIRCUIT, RELATED DRIVE CONTROL METHOD AND IMAGE READING APPARATUS

CROSS-REFERENCE TO RELATED APPLICATION

This application is based upon and claims the benefit of priority from the prior Japanese Patent Application No. 2004-380380, filed Dec. 28, 2004, the entire contents of which is incorporated herein by reference.

BACKGROUND OF THE INVENTION

1. Field of the Invention

The present invention relates to a driver circuit, associated drive control method and an image reading apparatus. More particularly, the present invention relates to an image reading driver circuit and its drive control method as well as an image reading apparatus comprising this driver circuit in which a plurality of detection signals corresponding to a detectable object image pattern are read out in parallel and output as time series read data.

2. Description of the Related Art

Conventionally, there are image reading apparatus for reading detectable object images contained in printed material, photographs, fingerprints, etc., for example, a CCD (Charged Coupled Device) which includes a photosensor array comprising a plurality of photosensors (photoelectric transducers) arrayed in a line form (one-dimensional) or a matrix form (two-dimensional) A known configuration exposes irradiated light toward a read object (detectable object) placed upon the detection surface of a photosensor array. The reflected light of the read object is sequentially scanned for every row and read. The electrical signals (detection signals) detected corresponding to a detectable object image pattern of each of the photosensors for every column is read out in parallel. Subsequently, parallel-to-serial conversion is performed and the read data containing time series data is generated and outputted.

FIG. 16 is an outline configuration diagram showing one example of a conventional prior art image reading apparatus.

FIG. 17 is an outline configuration diagram showing another example of a conventional prior art image reading apparatus.

In the example shown in FIG. 16, the outline configuration comprises a photosensor array 110Y containing a plurality of photosensors PSy comprised of photodiodes PD arrayed in a matrix form; a scanning driver circuit 120Y for sequentially setting in a selective state and scanning the photosensors PSy for every row; a signal driver circuit 130Y for receiving in parallel the detection signals outputted from the photosensors PSy of the rows being set in a selective state and outputting the read data Vdata containing time series data; and a timing control circuit 140Y for supplying a predetermined timing control signal to the scanning driver circuit 120Y and the signal driver circuit 130Y as well as for controlling the image reading operation of a detectable object image.

Here, the signal driver circuit 130Y, for example, has a configuration comprising a storage capacitor Cy (may be wiring capacity which is parasitic on the read-out lines Lread) for receiving in parallel and maintaining for every column (read-out lines Lread) the electrical signals (detection signals; for example, voltage corresponding to a photoelectric charge) detected corresponding to the detectable object image pattern by the photosensors PSy of the rows being set in a selective state by the scanning driver circuit 120Y; an amplifier AMPy for amplifying the voltage components of the detection signals maintained in the storage capacitor Cy for every column to a predetermined voltage level; and a multiplexer MPL for performing parallel-to-serial conversion of the amplified processed detection signals and generating output of the read data Vdata containing of time series data.

Moreover, as seen in FIG. 17, the outline configuration comprises a photosensor array 110Z consisting of a plurality of photosensors PSz comprising phototransistors PT in a one dimensional array; and a signal driver circuit 130Z for receiving in parallel the detection signals detected by each of the photosensors PSz and outputting the read data Vdata containing time series data.

Here, the signal driver circuit 130Z, for example, has a configuration comprising a storage capacitor Cz (may be wiring capacity which is parasitic on the read-out lines Lread) for receiving in parallel and maintaining the electrical signals (detection signals) detected by each of the photosensors PSz corresponding to a detectable object image pattern; a shift register SRz for sequentially outputting at predetermined timing the shift signals Sp1, Sp2, Sp3 ... corresponding to each of the photosensors PSz; a transistor group TRG (switches) for outputting in time series the detection signals maintained in the storage capacitor Cz for each of the above-mentioned photosensors PSz as "ON" operations are sequentially performed based on the shift signals Sp1, Sp2, Sp3, ... and a single amplifier AMPz for amplifying the voltage components of the detection signals outputted in time series to a predetermined voltage level and outputting as the read data Vdata.

Thus, either configuration of the image reading apparatus disclosed in conventional prior art has a structure in which an amplifier is provided for amplifying the detection signals (electrical signals) detected by photosensors to a predetermined signal level. For that reason, there are drawbacks as described below.

Specifically, as seen in FIG. 16, in the case of having a configuration provided with a plurality of amplifiers corresponding to each of the photosensors for amplifying individually and in parallel the detection signals outputted from the photosensors of every column, a plurality of the above-mentioned amplifiers are constantly set in a drive state during an image reading operation period which reads a detectable object image. Thus, because electrical current is constantly supplied based on bias voltage for this drive, there are drawbacks in that this configuration generates an increase in power consumption in the image reading apparatus and increases the amount of heat generation in the read-driver circuit.

Furthermore, as seen in FIG. 17, there is the case of having a configuration which performs amplification processing using a single amplifier after parallel-to-serial conversion of the detection signals outputted from each of the photosensors. Although the installed number of amplifiers and associated installation areas can be reduced, in order to perform essential amplification processing of the detection signals (read data) after conversion to time series data and to sequentially correspond with that time series timing, the drive frequency of the amplifier must be set higher. Thus, this configuration also has the drawback of generating an increase in power consumption.

SUMMARY OF THE INVENTION

The present invention provides an image reading apparatus provided with a driver circuit comprising a plurality of detection signals read out in parallel corresponding to a detectable object image pattern and outputs as time series read data. The present invention distinctly has a primary advantage of being able to reduce power consumption and the amount of heat generation related to the amplification processing of detection signals.

In order to acquire the above-mentioned advantage, the first driver circuit in the present invention comprising: a shift signal generator for sequentially outputting shift signals at a predetermined time interval; a plurality of amplifiers respectively receiving a plurality of detection signals read out in parallel corresponding to a detectable object image pattern and respectively receiving the shift signals, wherein the plurality of amplifiers respectively amplify and output the detection signals inputted thereto based on the output timing of each of the shift signals inputted thereto; a plurality of current controllers respectively corresponding to the plurality of amplifiers for individually controlling a supply state of electrical current to each of the amplifiers based on the output timing of each of the shift signals; and a data converter for outputting in time series each of the amplified detection signals outputted from each of the amplifiers based on the output timing of each of the shift signals and for generating time series read data.

Each of the amplifiers comprises a source follower amplifier circuit. Each of the current controllers comprise means for setting in a drive state an amplifier from among the plurality of amplifiers that is supplied the shift signals by the shift signal generator and for setting in a non-drive state other amplifiers from among the plurality of amplifiers.

Each of the amplifiers, for example, comprise a configuration having a first transistor element and a second transistor element coupled in series to form a current path between terminals of a predetermined supply voltage; wherein a signal based on the detection signals is applied to a control terminal of the first transistor element; and wherein the amplified detection signals are outputted from a junction point in the current path of the first transistor element and the second transistor element.

Each of the current controllers comprise any of a first configuration provided with means for applying a signal based on the shift signals to a control terminal of the second transistor element; and wherein a signal level of a signal applied to the control terminal of the second transistor element in the amplifier that is supplied the shift signals is such that the second transistor element reaches an "ON" state and a signal level of a signal applied to the control terminal of the second transistor element in the other amplifiers is such that the second transistor element reaches an "OFF" state. A second configuration comprising means for controlling the signal level of the signal applied to the control terminal of the first transistor element based on the shift signals; and wherein the signal level of the signal applied to the control terminal of the first transistor element in the other amplifiers is such that the first transistor element reaches an "OFF" state. A third configuration comprising a current control switch coupled in series with the first transistor element and the second transistor element between the terminals of the predetermined supply voltage of each of the amplifiers; and means for setting in an "ON" state the current control switch in the amplifier that is supplied the shift signals and for setting in an "OFF" state the current control switch in the other amplifiers.

In addition, the data converter comprises a plurality of output control switches respectively corresponding to the plurality of amplifiers for outputting the amplified detection signals in synchronization with the amplifiers.

In order to acquire the above-mentioned advantage, the second driver circuit in the present invention comprising: a shift signal generator for sequentially outputting shift signals at a predetermined time interval; a data converter corresponding to each of a plurality of detection signals read out in parallel according to a detectable object image pattern and respectively receiving the shift signals, wherein each of the detection signals are outputted in time series based on the output timing of each of the shift signals; an amplifier receiving each of the detection signals in time series from the data converter, sequentially amplifying each of the detection signals to a predetermined signal level, wherein the amplifier generates and outputs time series read data; and a current controller for controlling a supply state of electrical current to the amplifier corresponding to the timing of the detection signals outputted in time series.

The amplifier comprises a source follower amplifier circuit. The current controller comprises means for setting in a non-drive state the amplifier corresponding to the timing between each of the detection signals outputted in time series from the data converter.

The amplifier, for example, comprises a configuration having a first transistor element and a second transistor element coupled in series to form a current path between the terminals of a predetermined supply voltage; wherein the detection signals outputted in time series are applied to a control terminal of the first transistor element and the read data is outputted from a junction point in the current path of the first transistor element and the second transistor element; and the current controller further comprises means in which a signal level of a signal applied to a control terminal of the second transistor element is such that the second transistor element reaches an "OFF" state corresponding to the timing between each of the detection signals outputted in time series.

Also, the driver circuit further comprises a signal resetting means for initializing the signal level of a signal applied to the amplifier at the timing between each of the detection signals. The signal resetting means, for example, has a third transistor element which applies a control signal corresponding to the timing between each of the detection signals, wherein one end of the current path is connected to a control terminal of the first transistor element and the other end is connected to a control terminal of a predetermined reset voltage. The signal resetting means comprises means in which the signal level of a signal applied to a control terminal of the first transistor element is such that the predetermined reset voltage of the first transistor element reaches an "OFF" state at timing between each of the detection signals.

In order to acquire the above-mentioned advantage, the first image reading apparatus in the present invention comprising: a photosensor array having a plurality of photosensors are arrayed in a matrix form; a scanning driver circuit which outputs a scanning signal for simultaneously setting in a selective state the plurality of photosensors for each row of the photosensor array; a signal driver circuit which reads out in parallel a plurality of detection signals corresponding to a detectable object image placed upon the photosensor array from each of the photosensors set in a selective state by the scanning driver circuit. The signal driver circuit comprises a shift signal generator for sequentially outputting shift signals at a predetermined time interval; a plurality of amplifiers respectively receiving a plurality of detection signals and respectively receiving the shift signals, wherein the plurality of amplifiers respectively amplify and output the detection signals inputted thereto based on the output timing of each of the shift signals inputted thereto; a plurality of current controllers respectively corresponding to the plurality of amplifiers for individually controlling a supply state of electrical current to each of the amplifiers based on the output timing of each of the shift signals; and a data converter for outputting in time series each of the amplified detection signals outputted from each of the amplifiers based on the output timing of each of the shift signals and for generating time series read data.

In order to acquire the above-mentioned advantage, the second image reading apparatus in the present invention comprising: a photosensor array having a plurality of photosensors are arrayed in a matrix form; a scanning driver circuit which outputs a scanning signal for simultaneously setting in a selective state the plurality of photosensors for each row of the photosensor array; a signal driver circuit which reads out in parallel a plurality of detection signals corresponding to a detectable object image placed upon the photosensor array from each of the photosensors set in a selective state by the scanning driver circuit. The signal driver circuit comprises a shift signal generator for sequentially outputting shift signals at a predetermined time interval; a data converter corresponding to each of a plurality of detection signals and respectively receiving the shift signals, wherein each of the detection signals are outputted in time series based on the output timing of each of the shift signals; an amplifier respectively receiving each of the detection signals in time series from the data converter, sequentially amplifying each of the detection signals to a predetermined signal level, wherein the amplifier generates and outputs time series read data; and a current controller for controlling a supply state of electrical current to the amplifier corresponding to the timing of the detection signals outputted in time series.

In order to acquire the above-mentioned advantage, the first drive control method in the present invention for executing sequential processing from among a plurality of amplifiers respectively receiving a plurality of detection signals read out in parallel corresponding to a detectable object image pattern comprising: setting in a drive state only one of the amplifiers and setting in a non-drive state other amplifiers from among the plurality of amplifiers; amplifying and outputting the detection signals to a predetermined signal level by the driver means set in the drive state at predetermined timing from among each of the plurality of amplifiers; and generating time series read data by sequentially outputting in time series each of the amplified detection signals by the plurality of amplifiers. In amplifying and outputting the detection signals by the amplifiers, electrical current flows only in the amplifier set in the drive state and electrical current does not flow in the other amplifiers set in a non-drive state from among the plurality of amplifiers.

In order to acquire the above-mentioned advantage, the second drive control method in the present invention comprising: converting a plurality of detection signals read out in parallel corresponding to a detectable object image pattern and outputting time series data; sequentially amplifying each of the detection signals outputted in time series to a predetermined signal level by a single amplifier and generating output of time series read data; and setting in a non-drive state the amplifier corresponding to timing between each of the detection signals outputted in time series. In the setting in a non-drive state the amplifier controls so that electrical current does not flow in the amplifier. Also, the drive control method further comprises setting a signal level of a signal applied to the amplifier to a predetermined reset voltage at timing between each of the detection signals outputted in time series.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a timing chart showing an example of the drive control operation of the driver circuit relating to the preferred embodiments of the present invention;

DETAILED DESCRIPTION OF THE PREFERRED EMBODIMENTS

Figure 1:
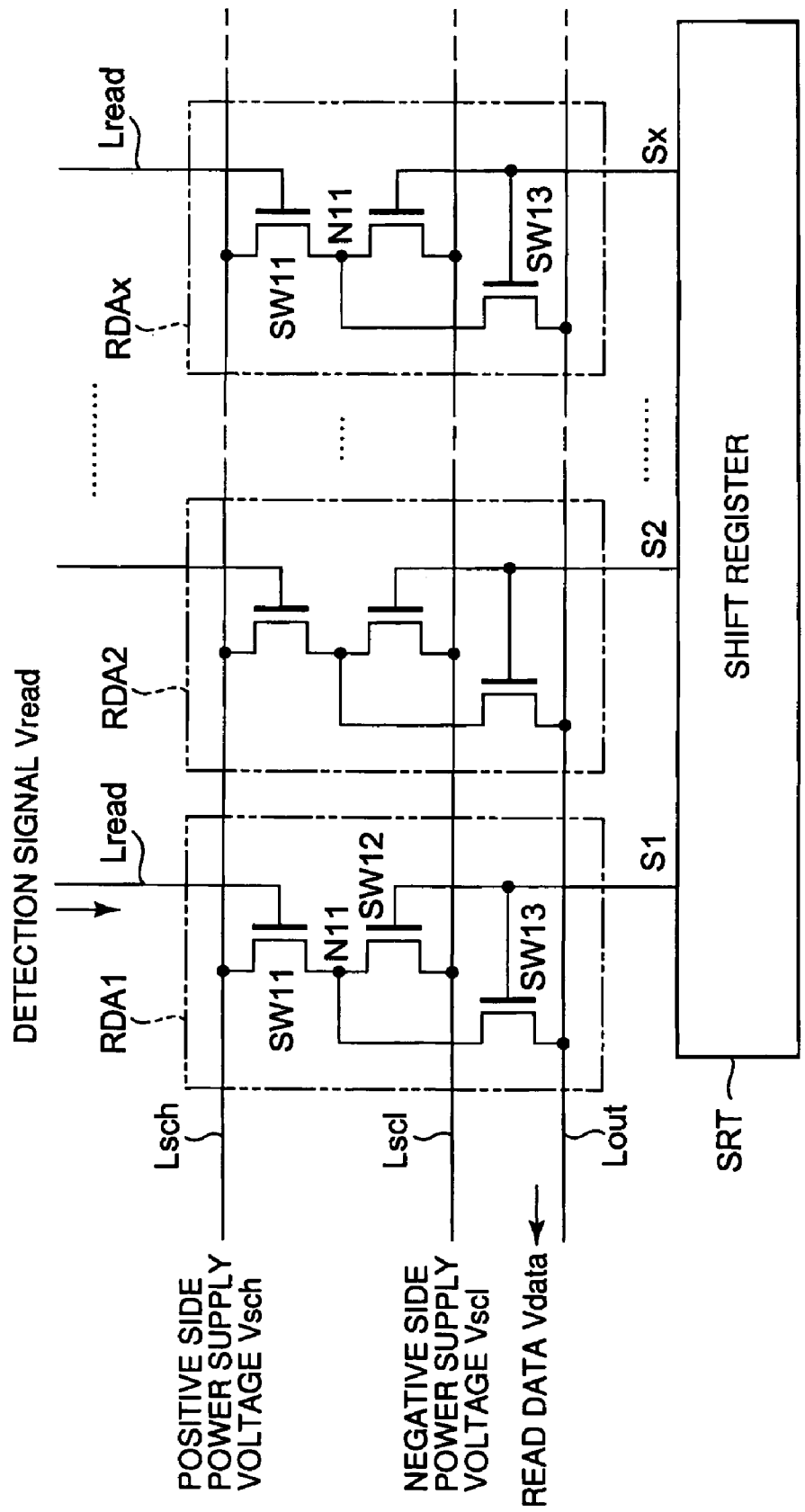
FIG. 1 is an outline circuit configuration view showing the first preferred embodiment of the driver circuit related to the present invention.

Hereinafter, the driver circuit related to the present invention and associated drive control method as well as the image reading apparatus comprising this driver circuit will be explained in detail based on the preferred embodiments as shown in the drawings.

Initially, a driver circuit related to the present invention and related drive control method will be explained.

First Preferred Embodiment

FIG. 1 is an outline circuit configuration view showing the first preferred embodiment of the driver circuit related to the present invention.

The driver circuit related to the preferred embodiment, as seen in FIG. 1, has an outline configuration comprising a plurality of read-out lines Lread for reading detection signals Vread (signal voltage) which are detected corresponding to a read object image pattern (detectable object) by each photosensor individually connected to a plurality of photosensors arrayed in parallel; a shift register SRT (shift signal generator) which outputs shift signals S1, S2, ... (hereinafter, denoted as "shift signals Sx") at predetermined timing corresponding to each of the read-out lines Lread; read-out circuit sections RDA1, RDA2, ... (hereinafter, denoted as "read-out circuit sections RDAX") which are individually provided corresponding to each of the read-out lines Lread (or each of the shift signals Sx); and a single output line Lout respectively set to each of the read-out circuit sections RDAx.

Additionally, each of the read-out circuit sections RDAx related to this preferred embodiment, for example, has a configuration comprising a driver side switching element SW11, a load side switching element SW12 and an output control switch SW13. The driver side switching element SW11 (first transistor element) is connected on one end side in the current path (source-drain terminals) to a positive side power source line Lsch to which positive side power supply voltage Vsch (high electric potential) is applied and the other end side is connected to a contact N11. Also, the above-mentioned read-out lines Lread are connected to the control terminal (gate terminal). The load side switching element SW12 (second transistor element) is connected on one end side in the current path to a negative side power source line Lscl to which negative side power supply voltage Vscl (low electric potential) is applied and the other end side is connected to the above-mentioned contact N11. Also, the shift signals Sx outputted from the above-mentioned shift register SRT are applied to the control terminal (gate terminal). The output control switch SW13 (data converter) is connected on one end side in the current path (source-drain terminals) to the above-mentioned contact N11 and the other end side is connected to the single output line Lout. Also, the shift signals Sx outputted from the above-mentioned shift register SRT are applied to the control terminal (gate terminal).

Specifically, in this preferred embodiment, a series circuit composed of the driver side switching element SW11 and the load side switching element SW12 constitutes a source follower amplifier circuit.

In addition, the "ON/OFF" control operations of the load side switching element SW12 are controlled by applying the shift signals Sx to the control terminal (gate terminal) of the load side switching element SW12. This constitutes an amplification operation controller (current controller) for controlling amplification operations (supply state of electrical current related to amplification processing) provided in the driver side switching element SW11.

Also, the output control switch SW13 constitutes a parallel-to-serial converter (data converter) for converting the amplified detection signals (parallel data) into time series data (serial data). Here, the positive side power supply voltage Vsch and the negative side power supply voltage Vsdl function as substantially the load (resistance) for the load side switching element SW12. The series circuit which constitutes the source follower amplifier circuit composed of the driver side switching element SW11 and the load side switching element SW12 sets the voltage value.

Furthermore, the driver side switching element SW11, the load side switching element SW12 and the output control switch SW13 which constitute each of the read-out circuit sections RDAx, for example, can be configured with the application of any n-channel type field effect transistor (thin-film transistor).

In the drive control operation in the driver circuit having such a configuration, initially, the detection signals Vread (signal voltage) detected by each of the photosensors are applied to the control terminal (thin-film transistor gate terminal) of the driver side switching element SW11 connected to each of the photosensors.

Here, in cases where the shift signals Sx (S1, S2, ...) of a high-level are being outputted at predetermined timing from the shift register SRT, the load side switching element SW12 performs an "ON" operation. Correspondingly, as the output control switch SW13 performs an "ON" operation, bias voltage based on the positive side power supply voltage Vsch and the negative side power supply voltage Vscl is applied by the series circuit composed of the driver side switching element SW11 and the load side switching element SW12. Electrical current having a current value corresponding to each of the detection signals Vread flows into the negative side power source line Lscl via the driver side switching element SW11 and the load side switching element SW12 which constitute the amplifier of a source follower type from the positive side power source line Lsch.

Accordingly, electric potential amplified by a predetermined amplification factor corresponding to the signal level of the detection signals Vread for each of the photosensors is generated at the junction contact (contact N11) of the driver side switching element SW11 and the load side switching element SW12. Each read data Vdata having a signal level based on this electric potential is outputted to the output line Lout via the output control switch SW13.

Conversely, in cases where the shift signals Sx of a low-level are being outputted from the shift register SRT, as the load side switching element SW12 performs an "OFF" operation correspondingly the output control switch SW13 performs an "OFF" operation. Electrical current does not flow into the series circuit composed of the driver side switching element SW11 and the load side switching element SW12. Also, output to the output line Lout of the read data Vdata based on the electric potential of the contact N11 is shut off.

In this manner, from among the read-out circuit sections RDAx provided in parallel corresponding to a plurality of photosensors, electrical current flows only to the read-out circuit sections RDAx in which the shift signals Sx of a high-level are inputted thereto from the shift register SRT to the series circuit, composed of the driver side switching element SW11 and the load side switching element SW12, and executes amplification processing. Furthermore, the operation outputs these amplified detection signals to the output line Lout via the output control switch SW13. Thus, by executing sequential processing from among the read-out circuit sections RDAx (namely, each of the photosensors) based on the output timing of the shift signals Sx from the shift register SRT, for example, the read data Vdata corresponding to an image pattern for a one row portion of a detectable object can be acquired as time series data.

Therefore, according to the driver circuit related to this preferred embodiment, the detection signals (parallel data) are detected in parallel by a plurality of photosensors corresponding to a detectable object image pattern. The operation amplifies to a predetermined signal level and outputs to a single output line at different timing for each of the photosensors. The operation performs repeated execution in order to convert and output time series read data (serial data). From among a plurality of read-out circuit sections provided corresponding to each of the photosensors (read-out lines), electrical current flows only through a single read-out circuit section which is executing the above-mentioned amplification processing and parallel-to-serial conversion processing. The configuration is structured so that the electrical current supply to the other read-out circuit sections is shutoff. Accordingly, power consumption and the amount of heat generation in the driver circuit can be markedly suppressed.

Second Preferred Embodiment

Figure 2:
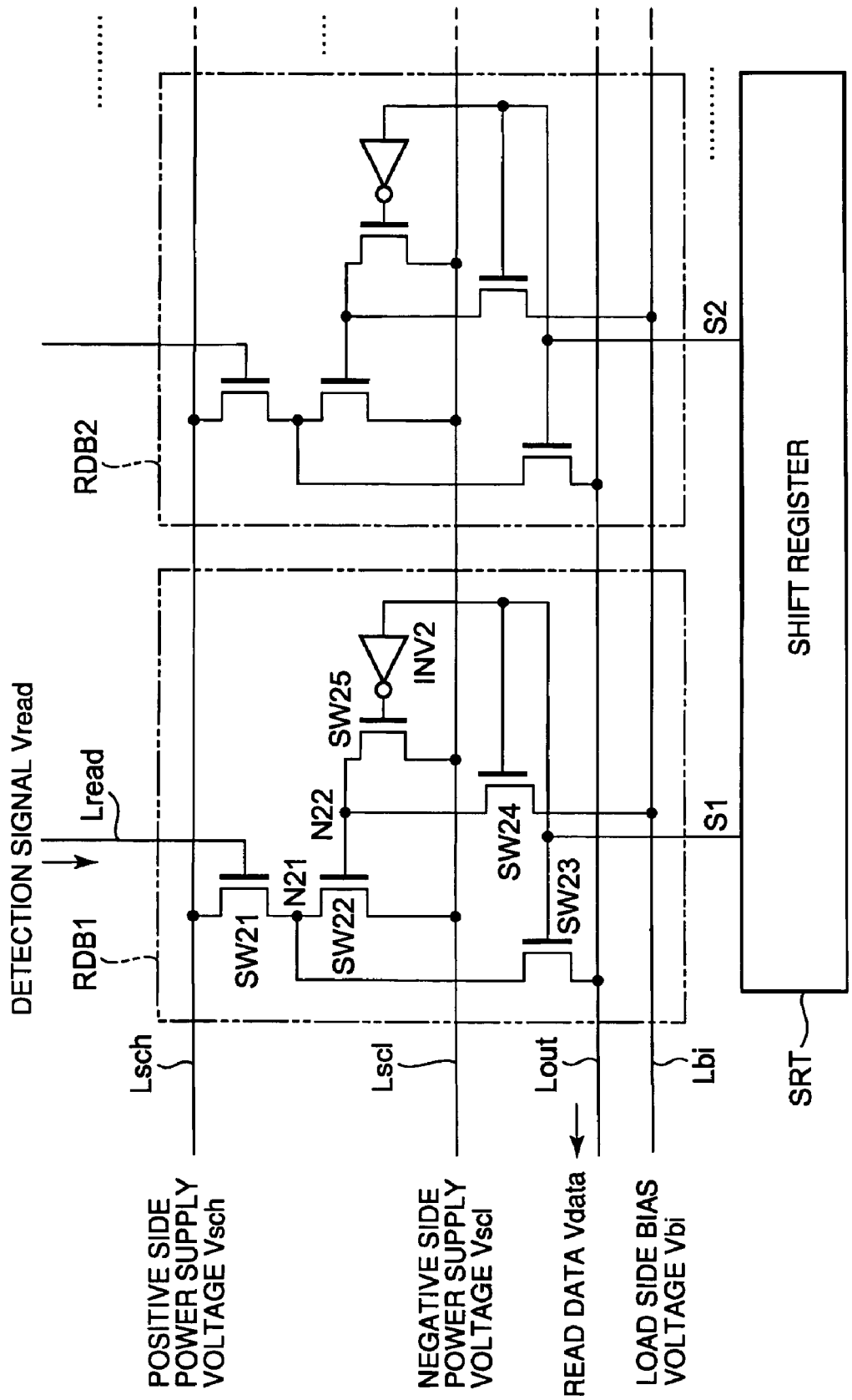
FIG. 2 is an outline circuit configuration view showing the second preferred embodiment of the driver circuit related to the present invention.

FIG. 2 is an outline circuit configuration view showing the second preferred embodiment of the driver circuit related to the present invention.

Here, with respect to any configuration equivalent to the first preferred embodiment mentioned above, the equivalent or same nomenclature is appended and the description simplified.

The driver circuit related to this preferred embodiment, as seen in FIG. 2, comprises individual read-out circuit sections RDB1, RDB2, . . . (hereinafter, denoted as "read-out circuit sections RDBX") provided corresponding to each of the read-out lines Lread connected to each of a plurality of photosensors and each of the shift signals Sx (S1, S2, . . . ) from the shift register SRT. Each of the read-out circuit sections RDBx has an outline configuration comprising a driver side switching element SW21, a load side switching element SW22, an output control switch SW23, a bias control switch SW24, an inverter INV2 and a load side control switch SW25. The driver side switching element SW21 is connected on one end side in the current path to the positive side power source line Lsch and the other end side is connected to contact N21. Also, the control terminal is connected to the read-out lines Lread. The load side switching element SW22 is connected on one end side in the current path to the negative side power source line Lscl and the other end side is connected to the above-mentioned contact N21. Also, the control terminal is connected to a contact N22. The output control switch SW23 is connected on one end side in the current path to contact N21 and the other end side is connected to the single output line Lout. Also, the shift signals Sx outputted from the above-mentioned shift register SRT are applied to the control terminal. The bias control switch SW24 is connected on one end side in the current path (source-drain terminals) to contact N22 and the other end side is connected to a bias voltage line Lbi for applying load side bias voltage. Also, the above-mentioned shift signals Sx are applied to the control terminal (gate terminal). The inverter INV2 performs reversal processing of the above-mentioned shift signals Sx. The load side control switch SW25 is connected on one end side in the current path (source-drain terminals) to contact N22 and the other end side is connected to the negative side power source line Lscl. Also, the reversal signals of the shift signals Sx are applied to the control terminal (gate terminal).

Specifically, in this preferred embodiment and equal to the above-mentioned first preferred embodiment, a series circuit composed of the driver side switching element SW21 and the load side switching element SW22 constitutes the source follower amplifier circuit.

Moreover, a complementary circuit (including the inverter INV2) composed of the bias control switch SW24 and the load side control switch SW25 controls "ON/OFF" operations of the load side switching element SW22. This constitutes an amplification operation controller (current controller) for controlling amplification operations (supply state of electrical current related to amplification processing) provided in the driver side switching element SW21.

Also, the output control switch SW23 constitutes a parallel-to-serial converter (data converter) for converting the amplified detection signals into time series data.

Furthermore, the driver side switching element SW21, the load side switching element SW22, the output control switch SW23, the bias control switch SW24 and the load side control switch SW25 which constitute each of the read-out circuit sections RDBx, for example, can be configured with the application of any n-channel type field effect transistor (thin-film transistor).

In the drive control operation in the read-out driver circuit having such a configuration, initially, the detection signals Vread (voltage components) detected by each of the photosensors are applied to the control terminal of the driver side switching element SW21 connected to each of the photosensors. In this situation, corresponding to the shift signals Sx (S1, S2, . . . ) of a high-level being outputted from the shift register SRT, the bias control switch SW24 performs an "ON" operation. Correspondingly, as the load side control switch SW25 performs an "OFF" operation, electrical current based on a load side bias voltage Vbi is applied to contact N22 (control terminal of the load side switching element SW22) via the bias control switch SW24 from the bias voltage line Lbi and the load side switching element SW22 performs an "ON" operation. Also, as the output control switch SW23 performs an "ON" operation, the contact N21 is electrically connected to the output line Lout.

Accordingly, electrical current having a current value corresponding to each of the detection signals Vread flows into the series circuit composed of the driver side switching element SW21 and the load side switching element SW22. Electric potential amplified by a predetermined amplification factor corresponding to the signal level of the detection signals Vread for each of the photosensors is generated at contact N21 and each read data Vdata having a signal level based on this electric potential is outputted to the output line Lout via the output control switch SW23.

Conversely, in cases where the shift signals Sx of a low-level are being outputted from the shift register SRT, the bias control switch SW24 performs an "OFF" operation. Correspondingly, as the load side control switch SW25 performs an "ON" operation, negative side power supply voltage Vscl is applied to contact N22 via the load side control switch SW25 and the load side switching element SW22 performs an "OFF" operation.

At this time, since the negative side power supply voltage Vscl is applied the control terminal (contact N22) of the load side switching element SW22 via the load side control switch SW25, so that the voltage applied to the control terminal of the driver side switching element SW22 is decreased in proportion to a threshold voltage Vth of the load side control switch SW25 for the negative side power supply voltage Vscl. Specifically, in the load side switching element SW22, because a low voltage in proportion to the threshold value voltage Vth will be applied to the gate terminal (contact N22) rather than source voltage (negative side power supply voltage Vscl), the load side switching element SW22 is completely set in an "OFF" state. Electrical current does not flow into the series circuit composed of the driver side switching element SW21 and the load side switching element SW22.

Also, as the output control switch SW23 performs an "OFF" operation, the contact N21 and the output line Lout are electrically disconnected and the voltage component based on the electric potential of contact N21 is not outputted to the output line Lout.

Accordingly, from among the read-out circuit sections RDBx provided corresponding to each of the photosensors, electrical current flows only to the read-out circuit sections RDBx in which the shift signals Sx of a high-level are inputted thereto from the shift register SRT. Electrical current flows into the series circuit composed of the driver side switching element SW21 and the load side switching element SW22 and executes amplification processing. In the other read-out circuit sections RDBx, electrical current is completely shut off by the load side switching element SW22.

Therefore, in the driver circuit related to this preferred embodiment, "OFF" operations of the load side switching element SW22 can be more reliably performed as compared with the case where using the shift signals outputted from the shift register SRT and performing direct "ON/OFF" operations of the above-stated load side switching element SW12 described in the previous first preferred embodiment. Notably, influence due to electrical current leak (leakage) resulting from fluctuation in the signal level of the shift signals, the device characteristics of the load side switching element, etc, is prevented. While being able to output appropriate read data Vdata, the increase in power consumption accompanying this current leak can be suppressed.

Third Preferred Embodiment

Figure 3:
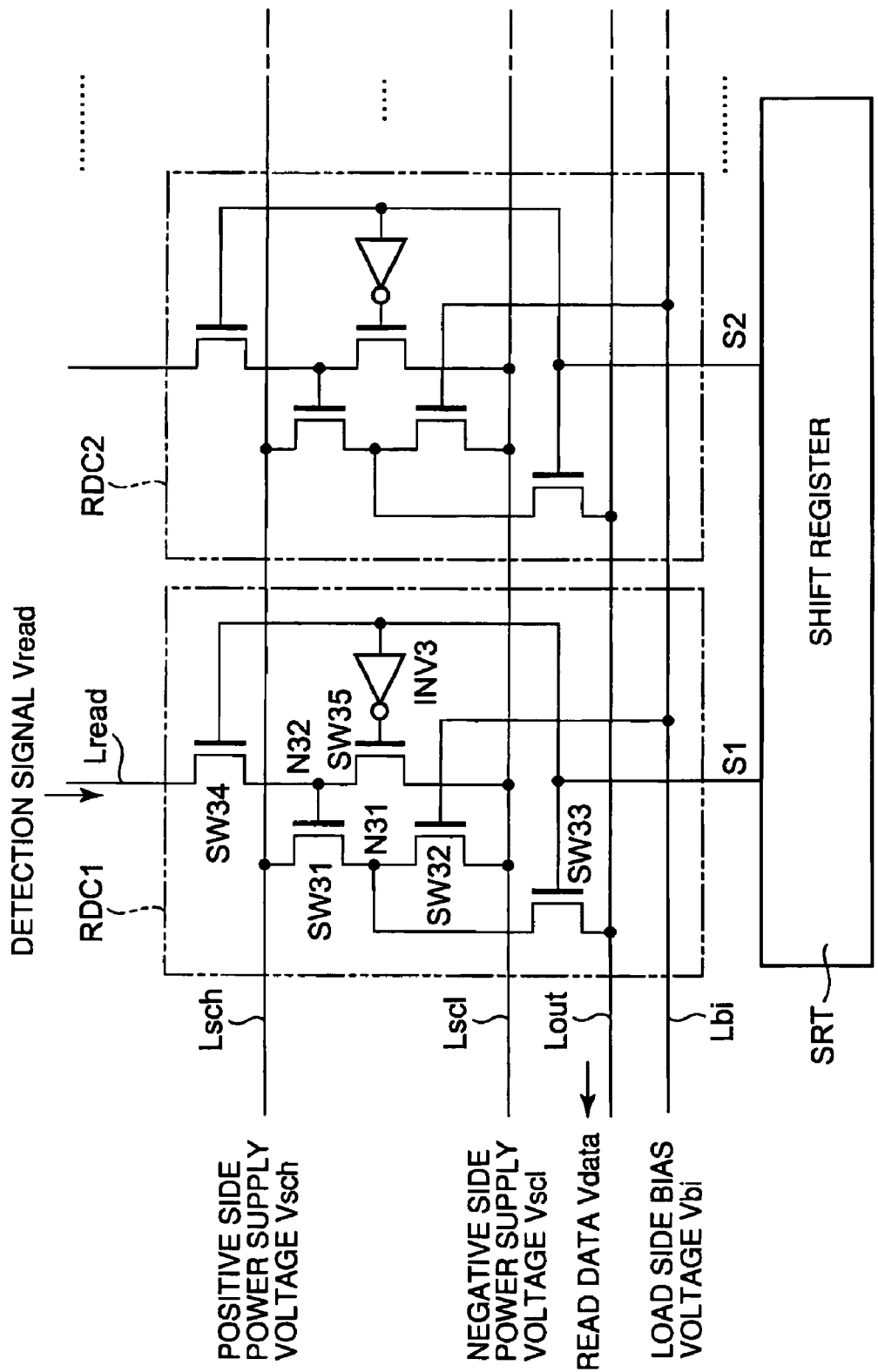
FIG. 3 is an outline circuit configuration view showing the third preferred embodiment of the driver circuit related to the present invention.

FIG. 3 is an outline circuit configuration view showing the third preferred embodiment of the driver circuit related to the present invention.

Here, with respect to any configuration equivalent of each of the preferred embodiments mentioned above, the equivalent or same nomenclature is appended and the description simplified.

The driver circuit related to the preferred embodiment, as seen in FIG. 3. Like each of the preferred embodiments above, in summary, individual read-out circuit sections RDC1, RDC2, . . . (hereinafter, denoted as "read-out circuit sections RDCx") are provided corresponding to each of the read-out lines Lread connected to each of a plurality of photosensors and each of the shift signals Sx (S1, S2, . . . ) from the shift register SRT. Each of the read-out circuit sections RDCx has an outline configuration comprising a driver side switching element SW31, a load side switching element SW32, an output control switch SW33, a read-out control switch SW34 (current control switch), an inverter INV3, and a driver side control switch SW35. The driver side switching element SW31 is connected on one end side in the current path to the positive side power source line Lsch and the other end side is connected to contact N31. Also, the control terminal is connected to a contact N32. The load side switching element SW32 is connected on one end side in the current path to the negative side power source line Lscl and the other end side is connected to the above-mentioned contact N31. Also, the control terminal is connected to the bias voltage line Lbi. The output control switch SW33 is connected on one end side in the current path to contact N31 and the other end side is connected to the single output line Lout. Also, the shift signals Sx outputted from the above-mentioned shift register SRT are applied to the control terminal. The read-out control switch SW34 is connected on one end side in the current path (source-drain terminals) to the read-out lines Lread and the other end side is connected to contact N32. Also, the above-mentioned shift signals Sx are applied to the control terminal (gate terminal) The inverter INV3 performs reversal process-ing of the above-mentioned shift signals Sx. The driver side control switch SW35 is connected on one end side in the current path (source-drain terminals) to contact N32 and the other end side is connected to the negative side power source line Lscl. Also, the reversal signals of the shift signals Sx are applied to the control terminal (gate terminal).

Specifically, in this preferred embodiment and equal to the above-mentioned first and second preferred embodiments, a series circuit composed of the driver side switching element SW31 and the load side switching element SW32 constitutes the source follower amplifier circuit.

Also, the output control switch SW33 constitutes a parallel-to-serial converter (data converter) for converting the amplified detection signals into time series data.

Moreover, a complementary circuit (including the inverter INV3) composed of the read-out control switch SW34 and the driver side control switch SW35 controls "ON/OFF" operations of the driver side switching element SW31. This constitutes a driver side controller (current controller) for controlling amplification operations (supply state of electrical current related to amplification processing) provided in the driver side switching element SW31.

Furthermore, the driver side switching element SW31, the load side switching element SW32, the output control switch SW33, the read-out control switch SW34 and the driver side control switch SW35 which constitute each of the read-out circuit sections RDCx, for example, can be configured with the application of any n-channel type field effect transistor (thin-film transistor).

In the drive control operation in the read-out driver circuit having such a configuration, initially, the detection signals Vread (voltage components) detected by each of the photosensors are applied to each of the read-out lines Lread. In this situation, corresponding to the shift signals Sx (S1, S2, . . . ) of a high-level being outputted from the shift register SRT, the read-out control switch SW34 performs an "ON" operation. Correspondingly, as the driver side control switch SW35 performs an "OFF" operation, electrical current based on the detection signals Vread is applied to contact N32 (control terminal of the driver side switching element SW31) via the read-out control switch SW34 from the read-out lines Vread and the driver side switching element SW31 performs an "ON" operation. Here, the load side switching element SW32 is set in an "ON" state by constantly applying load side bias voltage Vbi to the control terminal of the load side switching element SW32. Also, as the output control switch SW33 performs an "ON" operation, the contact N31 is electrically connected to the output line Lout.

Accordingly, electrical current having a current value corresponding to each of the detection signals Vread flows into the series circuit composed of the driver side switching element SW31 and the load side switching element SW32. Electric potential amplified by a predetermined amplification factor corresponding to the signal level of the detection signals Vread for each of the photosensors is generated at contact N31 and each read data Vdata having a signal level based on this electric potential is outputted to the output line Lout via the output control switch SW33.

Conversely, in cases where the shift signals Sx of a low-level are being outputted from the shift register SRT, the read-out control switch SW34 performs an "OFF" operation. Correspondingly, as the driver side control switch SW35 performs an "ON" operation, negative side power supply voltage Vscl is applied to contact N32 and the driver side switching element SW31 performs an "OFF" operation.

At this time, since the negative side power supply voltage Vscl is applied the control terminal (contact N32) of the driver side switching element SW31 via the driver side control switch SW35, so that voltage applied to the control terminal of the driver side switching element SW31 is decreased in proportion to the threshold voltage Vth of the driver side control switch SW35 for the negative side power supply voltage Vscl. Specifically, in the driver side switching element SW31, because low voltage in proportion to the threshold voltage Vth will be applied to the gate terminal (contact N32) rather than source voltage (electrical potential of contact N31; negative side power supply voltage Vscl), the driver side switching element SW31 is completely set in an "OFF" state. Electrical current does not flow into the series circuit composed of the driver side switching element SW31 and the load side switching element SW32.

Also, as the output control switch SW33 performs an "OFF" operation, the contact N31 and the output line Lout are electrically disconnected and the voltage component based on the electric potential of contact N31 is not outputted to the output line Lout.

Accordingly, from among the read-out circuit sections RDCx provided corresponding to each of the photosensors, electrical current flows only to the read-out circuit sections RDCx in which the shift signals Sx of a high-level are inputted thereto from the shift register SRT. Electrical current flows into the series circuit composed of the driver side switching element SW31 and the load side switching element SW32 and executes amplification processing. In the other read-out circuit sections RDCx, electrical current is completely shut off by the driver side switching element SW31.

Therefore, in the driver circuit related to this preferred embodiment, "OFF" operations of the driver side switching element can be more reliably performed as compared with the case where using the shift signals outputted from the shift register and performing direct "ON/OFF" operations of the above-stated driver side switching element described in the previous second preferred embodiment. Notably, influence due to electrical current leak (leakage) resulting from fluctuation in the signal level of the shift signals, the device characteristics of the load side switching element, etc, is prevented. While being able to output appropriate read data Vdata, the increase in power consumption accompanying this current leak can be suppressed.

Fourth Preferred Embodiment

Figure 4:
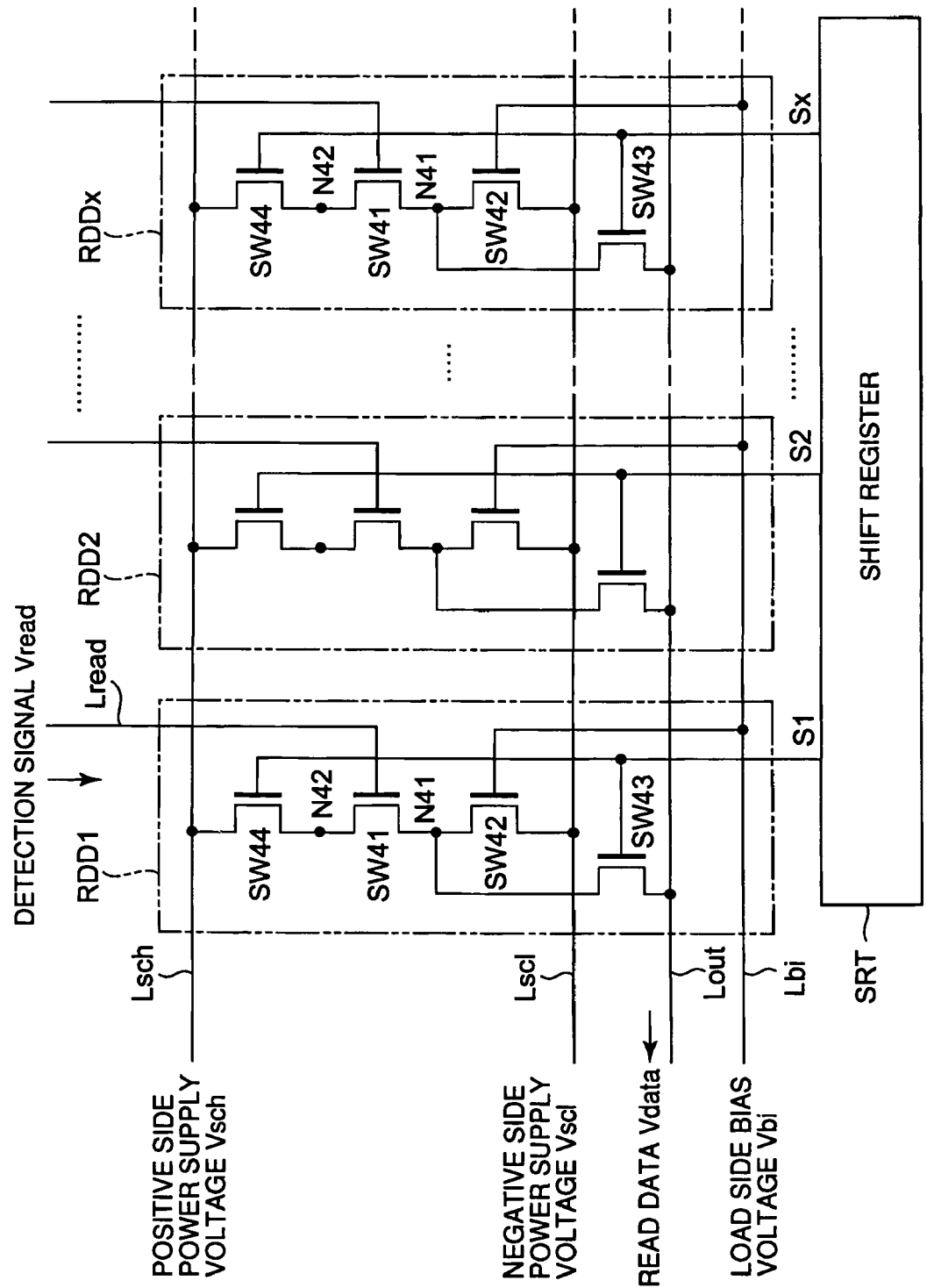
FIG. 4 is an outline circuit configuration view showing the fourth preferred embodiment of the driver circuit related to the present invention.

FIG. 4 is an outline circuit configuration view showing the fourth preferred embodiment of the driver circuit related to the present invention.

Here, with respect to any configuration equivalent of each of the preferred embodiments mentioned above, the equivalent or same nomenclature is appended and the description simplified.

The driver circuit related to this preferred embodiment is shown in FIG. 4. In summary, individual read-out circuit sections RDD1, RDD2, . . . (hereinafter, denoted as "read-out circuit sections RDDX") are provided corresponding to each of the read-out lines Lread connected to each of a plurality of photosensors and each of the shift signals Sx (S1, S2, . . . ) from the shift register SRT. Each of the read-out circuit sections RDDx has an outline configuration comprising a driver side switching element SW41, a load side switching element SW42, an output control switch SW43 and a current control switch SW44. The driver side switching element SW41 is connected on one end side in the current path to contact N42 and the other end side is connected to contact N41. Also, the control terminal is connected to the read-out lines Lread. The load side switching element SW42 is connected on one end side in the current path to the negative side power source line Lscl and the other end side is connected to the above-mentioned contact N41. Also, the control terminal is connected to the bias voltage line Lbi. The output control switch SW43 is connected on one end side in the current path to contact N41 and the other end side is connected to the single output line Lout. Also, the shift signals Sx outputted from the above-mentioned shift register SRT are applied to the control terminal. The current control switch SW44 is connected on one end side in the current path (source-drain terminals) to the positive side power source line Lsch and the other end side is connected to contact N42. Also, the above-mentioned shift signals Sx are applied to the control terminal (gate terminal).

Specifically, in this preferred embodiment and equal each of the above-mentioned preferred embodiments, a series circuit composed of the driver side switching element SW41 and the load side switching element SW42 constitutes the source follower amplifier circuit.

Also, the current controller (current controller) is constituted by the current control switch SW44 for controlling the electrical current supply state of the driver side switching element SW41 and the load side switching element SW42.

Besides, the output control switch SW43 constitutes a parallel-to-serial converter (data converter) for converting the amplified detection signals into time series data.

Furthermore, the driver side switching element SW41, the load side switching element SW42, the output control switch SW43 and the current control switch SW44 which constitute each of the read-out circuit sections RDDx, for example, can be configured with the application of any n-channel type field effect transistor (thin-film transistor).

In the drive control operation in the read-out driver circuit having such a configuration, initially, the detection signals Vread (voltage components) detected by each of the photosensors are applied to each of the read-out lines Lread. In this situation, corresponding to the shift signals Sx of a high-level being outputted from the shift register SRT, the current control switch SW44 performs an "ON" operation. Correspondingly, the output control switch SW43 performs an "ON" operation.

Accordingly, electrical current having a current value corresponding to each of the detection signals Vread flows into the series circuit composed of the driver side switching element SW41 and the load side switching element SW42 via the current control switch SW44. Electric potential amplified by a predetermined amplification factor corresponding to the signal level of the detection signals Vread for each of the photosensors is generated at contact N41 and each read data Vdata having a signal level based on this electric potential is outputted to the output line Lout via the output control switch SW43.

Conversely, in cases where the shift signals Sx of a low-level are being outputted from the shift register SRT, the current control switch SW44 performs an "OFF" operation. The electrical current supply into the series circuit composed of the driver side switching element SW41 and the load side switching element SW42 will be shut off. Also, as the output control switch SW43 performs an "OFF" operation, the contact N41 and the output line Lout are electrically disconnected and the voltage component based on the electric potential of contact N41 is not outputted to the output line Lout.

Accordingly, from among the read-out circuit sections RDDx provided corresponding to each of the photosensors, electrical current flows only to the read-out circuit sections RDDx in which the shift signals Sx of a high-level are inputted thereto from the shift register SRT. Electrical current flows into the series circuit composed of the driver side switching element SW41 and the load side switching element SW42 and executes amplification processing. In the other read-out circuit sections RDDx, electrical current is completely shut off by the current control switch SW44.

Therefore, in the driver circuit related to this preferred embodiment, since the electrical current supply state to the driver side switching element and the load side switching element is controlled using the shift signals outputted form the shift register, the electrical current supply can be reliably shut off, except for the read-out section which executes amplification processing and parallel-to-serial conversion processing. Accordingly, power consumption and the amount of heat generation in the driver circuit can be markedly suppressed.

Fifth Preferred Embodiment

Figure 5:
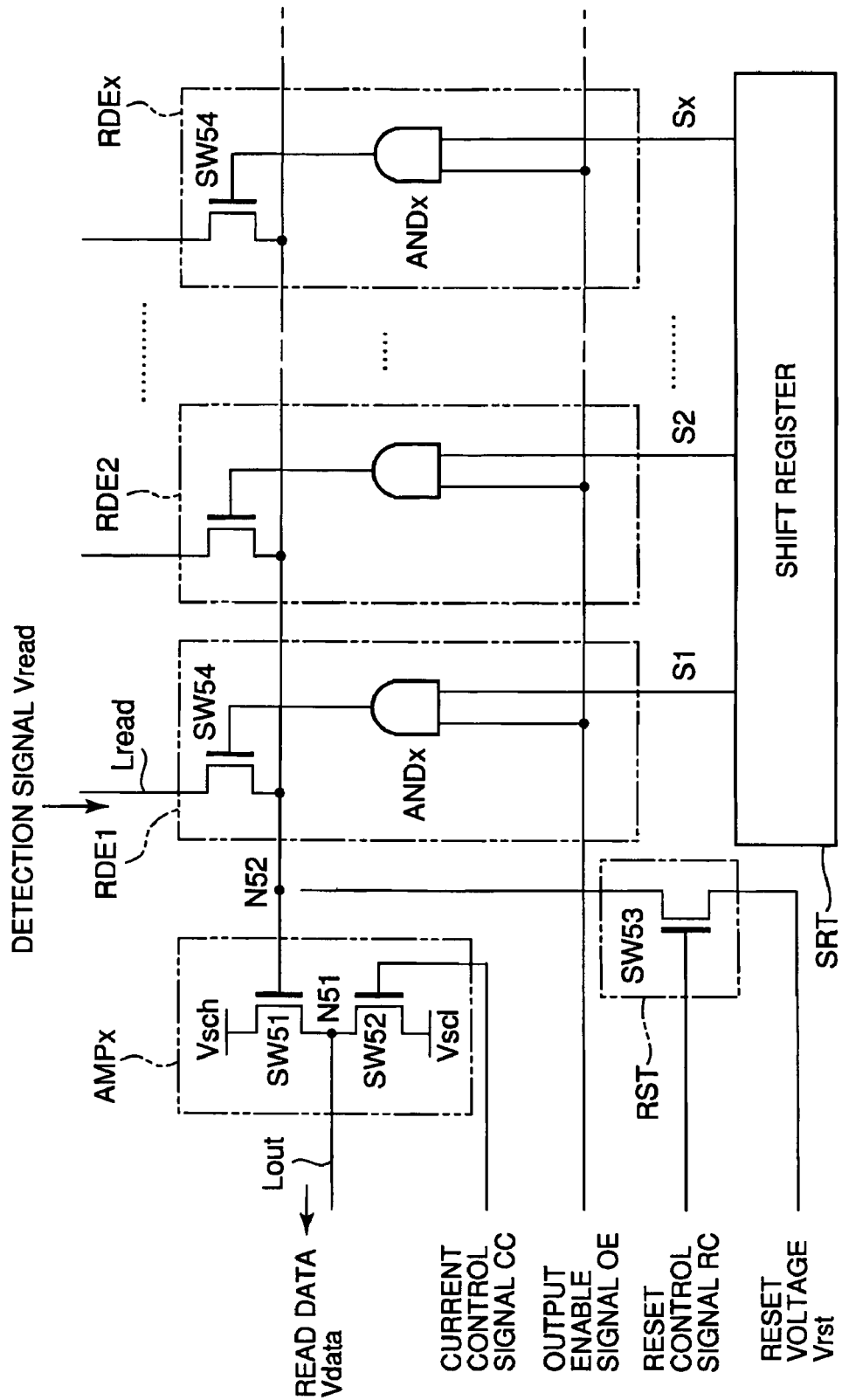
FIG. 5 is an outline circuit configuration view showing the fifth preferred embodiment of the driver circuit related to the present invention.

FIG. 5 is an outline circuit configuration view showing the fifth preferred embodiment of the driver circuit related to the present invention.

Here, with respect to any configuration equivalent of each of the preferred embodiments mentioned above, the equivalent or same nomenclature is appended and the description simplified.

The driver circuit related to this preferred embodiment is shown in FIG. 5. In summary, individual read-out circuit sections RDE1, RDE2, . . . (hereinafter, denoted as "read-out circuit sections RDEx") are provided corresponding to each of the read-out lines Lread connected to each of a plurality of photosensors and each of the shift signals Sx (S1, S2, . . . ) from the shift register SRT (shift signal generator). Each of the read-out circuit sections RDEx has an outline configuration comprising a single amplification circuit section AMPx and a reset circuit section RST. The single amplification circuit section AMPx (amplifier) amplifies to a predetermined signal level the detection signals Vread outputted in time series from the read-out circuit sections RDEx. The reset circuit section RST (signal resetting means) initializes the signal level inputted into the amplification circuit section AMPx to a reset voltage Vrst at a predetermined time interval.

Here, each of the read-out circuit sections RDEx related to this preferred embodiment, for example, has a configuration comprising a read-out control switch SW54 and two-input AND operation circuit ANDx (AND circuit). The read-out control switch SW54 (data converter) is connected on one end side in the current path (source-drain terminals) to the read-out lines Lread and the other end is connected to a common contact N52. The two-input AND operation circuit ANDx (logic element AND) is provided for each of the read-out lines Lread. The output contact is connected to the control terminal (gate terminal) of the above-mentioned read-out control switch SW54. Further, the shift signals Sx from the shift register SRT are inputted into one input contact as well as an output enable signal OE is inputted into the other input contact.

Additionally, the amplification circuit section AMPx, for example, has a configuration comprising a driver side switching element SW51 and a load side switching element SW52. The driver side switching element SW51 (first transistor) is connected on one end side in the current path to the applied positive side power supply voltage Vsch and the other end is connected to contact N51 (output contact). Also, the above-mentioned contact N52 is connected to the control terminal. The load side switching element SW52 (second transistor) is connected on one end side in the current path to the applied negative side power supply voltage Vscl and the other end is connected to the above-mentioned contact N51. Also, an applied current control signal CC is connected to the control terminal.

The reset circuit RST, for example, has a configuration comprising a reset switch SW53. The reset switch SW53 is connected on one end side in the current path (source-drain terminals) to the above-mentioned contact N52 and the other side is connected to the applied reset voltage Vrst. Also, an applied reset control signal RC is connected to the control terminal (gate terminal).

Specifically, in this preferred embodiment and equal each of the above-mentioned preferred embodiments, a series circuit composed of the driver side switching element SW51 and the load side switching element SW52 constitutes the source follower amplifier circuit.

In addition, the "ON/OFF" control operations of the load side switching element SW52 are controlled by applying the current control signal CC to the control terminal (gate terminal) of the load side switching element SW52. This constitutes an amplification operation controller (current controller) for controlling amplification operations (supply state of electrical current related to amplification processing) provided in the driver side switching element SW51.

Also, the read-out control switch SW54 and the AND circuits ANDx constitute a parallel-to-serial converter (data converter) for converting the detection signals Vread detected in parallel.

Furthermore, the reset switch SW53 constitutes a signal resetting means for initializing the electric potential of contact N52 at the timing between each of the detection signals Vread converted into time series data, namely, the signal level of the control terminal for the driver side switching element SW51.

In addition, the driver side switching element SW51, the load side switching element SW52, the reset switch SW53 and the read-out control switch SW54 which constitute each of the read-out circuit sections RDEx, for example, can be configured with the application of any n-channel type field effect transistor (thin-film transistor).

Also, the output enable signal OE and the current control signal CC, which are supplied to the above-mentioned read-out circuit sections RDEx and the amplification circuit section AMPx are described later in detail, are provided so that high-level and low-level conversion timing will be synchronized. Further, the reset control signal RC supplied to the above-mentioned reset circuit section RST is provided so as to have a reversal relationship to the above-mentioned output enable signal OE and the current control signal CC. The signal width of each of the shift signals Sx is set so as to constitute the sum of the signal width of the output enable signal OE and the reset control signal RC.

Moreover, the signal level Vch of the high-level side for the current control signal CC is set as a predetermined bias voltage which can perform an "ON" operation sufficiently and reliably of the load side switching element SW52 for the amplification circuit section AMPx. Also, the signal level Vcl of the low-level side of the current control signal CC is set to the voltage decreased at least in proportion to a threshold voltage Vth of the load side control switching element SW52 for the negative side power supply voltage Vscl.

Next the drive control operation of the driver circuit related to this preferred embodiment will be explained.

FIG. 6 is a timing chart showing an example of the drive control operation of the driver circuit relating to the preferred embodiments of the present invention.

In the drive control operation of the driver circuit having such a configuration as in FIG. 5, as seen in FIG. 6, initially, the detection signals Vread (voltage components) detected in parallel by each of the photosensors are applied to the read-out lines Lread (one end side in the current path of the read-out control switch SW54 of each of the read-out circuit sections RDEx) connected to each of the photosensors.

In this situation, corresponding to the shift signals Sx (S1, S2, . . . ) of a high-level being sequentially outputted at predetermined timing from the shift register SRT, the output enable signal OE is outputted at a predetermined signal width during the output period of each of the shift signals Sx. Each of the read-out control switch SW54 selectively performs an "ON" operation at a predetermined time cycle. The detection signals Vread are applied to each of the above-mentioned read-out lines Lread outputted in time series by the common contact N52.

Here, the electric potential of contact N52 sequentially outputs the detection signals Vread based on the shift signals Sx and the output enable signal OE at timing which constitutes an interval between output periods of each of the detection signals Vread. As the reset switch SW53 of the reset circuit section RST performs an "ON" operation based on the reset control signal RC, the predetermined reset voltage Vrst is applied to contact N52. Specifically, as seen in FIG. 6, the signal level based on the detection signals Vread detected by each of the photosensors becomes the signal level based on the reset voltage Vrst alternately outputted at contact N52.

Accordingly, each of the detection signals Vread, which are converted into serial data by each of the read-out circuit sections RDEx and the reset circuit section RST and sequentially outputted to contact N52, is applied to the control terminal of the driver side switching element SW51 of the amplification circuit section AMPx. On the other hand, by applying the current control signal CC which synchronizes with the output enable signal OE to the load side switching element SW52 control terminal, the load side switching element SW52 performs an "ON" operation synchronizing with the output timing of each of the above-mentioned detection signals Vread. Also, the amplification circuit section AMPx performs an "ON" operation synchronizing with the output timing of each of the detection signals Vread.

In this manner, the electrical current having a current value corresponding to each of the detection signals Vread flows between the positive side power supply voltage Vsch and the negative side power supply voltage Vscl. At this time, electric potential amplified by a predetermined amplification factor corresponding to the signal level of the detection signals Vread for each of the photosensors is generated at the junction contact (contact N51) of the driver side switching element SW51 and the load side switching element SW52 and sequentially outputted to the output line Lout as the read data Vdata.

Conversely, during timing between the detection signals Vread sequentially outputted to contact N52 (timing where the reset control signal RC reaches high-level), as the reset voltage Vrst of low electric potential is applied to the control terminal of the driver side switching element SW51 for the amplification circuit section AMPx, the driver side switching element SW51 performs and "OFF" operation. Synchronizing with this timing, the current control signal CC having a lower signal level in proportion to the threshold voltage Vth than the negative side power supply voltage Vscl is applied to the control terminal of the load side switching element SW52 and the load side switching element SW52 completely performs an "OFF" operation.

Consequently, in the non-output timing of the detection signals Vread, electrical current does not flow between the positive side power supply voltage Vsch and the negative side power supply voltage Vscl. Also, output of the read data Vdata to the output line Lout connected to contact N51 is shut off.

Therefore, according to the driver circuit related to this preferred embodiment, the detection signals (parallel data) are detected in parallel by a plurality of photosensors corresponding to a detectable object image pattern. After conversion into time series data (serial data), the detection signals are amplified to a predetermined signal level using a single amplifier and output to a single output line. Although necessary to drive the amplification circuit section at relatively high frequency corresponding to the time series data, in the non-output timing of the detection signals of the time series data the electrical current supply to the above-mentioned amplifier can be shut off. Thus, power consumption and the amount of heat generation in the driver circuit can be markedly suppressed.

<Application Example to an Image Reading Apparatus>

Next, an image reading apparatus which can apply the driver circuit related to the present invention and related drive control method will be explained in detail.

The driver circuit and related drive control method described in each of the above-mentioned preferred embodiments, for example, are applicable to a common knowledge image reading apparatus comprising a photosensor array configured with photosensors, such as photodiodes, phototransistors, etc. in a two-dimensional array like that shown in the conventional prior art.

Apart from that, in such a common knowledge image reading apparatus, it is necessary to individually set a selective transistor for each scanned photosensor in a selective state for each of the photosensors. In order to enhance the reading accuracy of a detectable object image (detecting accuracy of an image pattern), the number of detection pixels (reading pixels) increases. Thus, there is a problem in that the apparatus size becomes enlarged.

Therefore, in recent years, a configuration of photosensors for solving such a problem consists of a double-gate type thin-film transistor structure. What has been referred to as a double-gate type photosensor possessing a photo sensing function and a selective transistor function in the photosensor itself has been developed. This approach attains system miniaturization and reading pixel densification.

Hereinafter, an image reading apparatus comprised with a sensor array containing double-gate photosensors will be explained with reference to the drawings.

(Double-Gate Type Photosensor)

Initially, the element structure of a photosensor (double-gate type photosensor) applicable to the image reading apparatus related to the present invention will be explained with reference to the drawings.

Figure 7A:
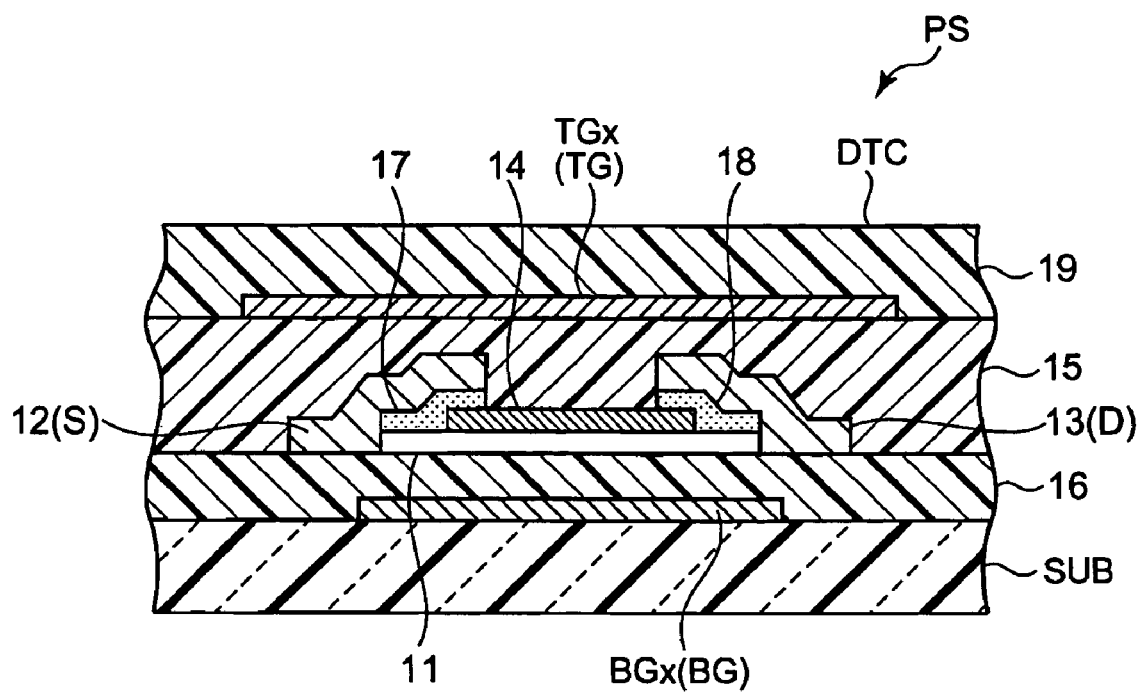
FIGS. 7A-7B are outline cross-sectional view diagrams showing the element structure of the photosensors applicable to the image reading apparatus related to the present invention.
Figure 7B:
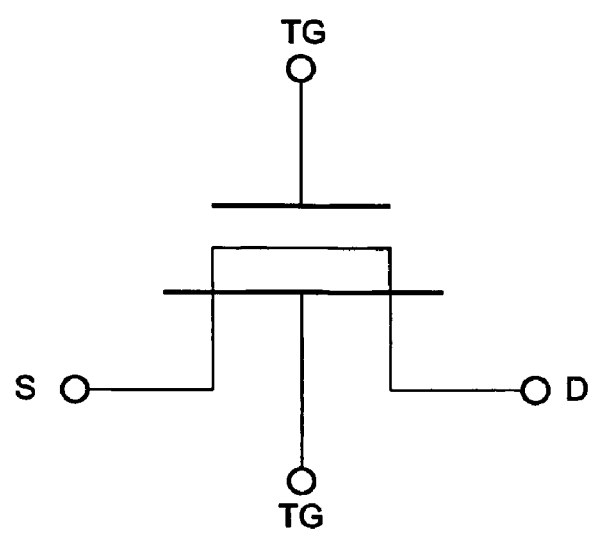

FIGS. 7A~7B are outline cross-sectional view diagrams showing the element structure of the photosensors applicable to the image reading apparatus related to the present invention.

As seen in FIG. 7A, an example of the double-gate type photosensors PS applicable to the image reading apparatus related to the present invention has an outline configuration comprising a top gate electrode TGx, a bottom gate electrode BGx, a semiconductor layer 11, a source electrode 12, a drain electrode 13, a block insulating film 14, a top gate insulating film 15, a bottom gate insulating film 16 and impurity layers 17~18. The semiconductor layer 11 (channel region) is composed of amorphous silicon, etc. in which an electron hole-pair is generated by incidence of excitation light (here visible light). The source electrode 12 (source terminal S) and the drain electrode 13 (drain terminal D) are opaque to visible light and composed of a conductive material selected from chromium, chromium alloy, aluminum, aluminum alloy, etc. Both formed in both ends of the semiconductor layer 11 via impurity layers 17~18 (ohmic contact layers) which are each composed of n+ silicon. The top gate electrode TGx (first gate electrode; top gate terminal TG) shows permeability to visible light (transparent) and composed of a transparent electrode layer, such as tin oxide film, Indium Oxide (ITO) film (Indium-stannic acidified film), etc, which is formed on the upper side of the semiconductor layer 11 (drawing upper side) via a block insulating film 14 (stopper film) and a top gate insulating film 15. The bottom gate electrode BGx (second gate electrode; top gate terminal BG) is opaque and impervious to visible light (non-transparent) composed of a conductive material selected from chromium, chromium alloy, aluminum, aluminum alloy, etc, which is formed on the lower side of the semiconductor layer 11 (drawing lower side) via a bottom gate insulating film 16.

Also, the double-gate type photosensors PS having such a configuration, as seen in FIG. 7A, contains a photosensor array described later which is formed on a transparent insulating substrate SUB, such as a glass substrate, etc, and a two-dimensional array is arranged on the substrate SUB. Further, a supplementary insulating film 19 (passivation film) coating is formed on the entire one side of the substrate SUB containing the double-gate type photosensors PS. An example of the double-gate type photosensor PS, commonly, is expressed by the equivalent circuit as shown in FIG. 7B.

In addition, as shown in FIG. 7A, the insulating films constituting of the top gate insulating film 15, the block insulating film 14, the bottom gate insulating film 16 and the supplementary insulating film 19 provided on the surface of the top gate electrode TGx are all constructed with material having high transmissivity to visible light which excites the semiconductor layer 11, for example, silicon nitride, silicon oxide, etc. This apparatus has a structure which permeates irradiated light from a light source (refer to FIG. 15 described later) set in the drawing lower side to the drawing upper side, reflects a detectable object placed on the upper surface DTC (hereinafter, denoted as the "detection surface") of the supplementary insulating film 19 and detects only the light which enters into the double-gate photosensors PS (in detail, semiconductor layer 11) from the drawing upper side.

(Image Reading Apparatus)

Next, the photosensor system (image reading apparatus) comprising a photosensor array with a two-dimensional array of the above-mentioned double-gate photosensors will be explained.

Figure 8:
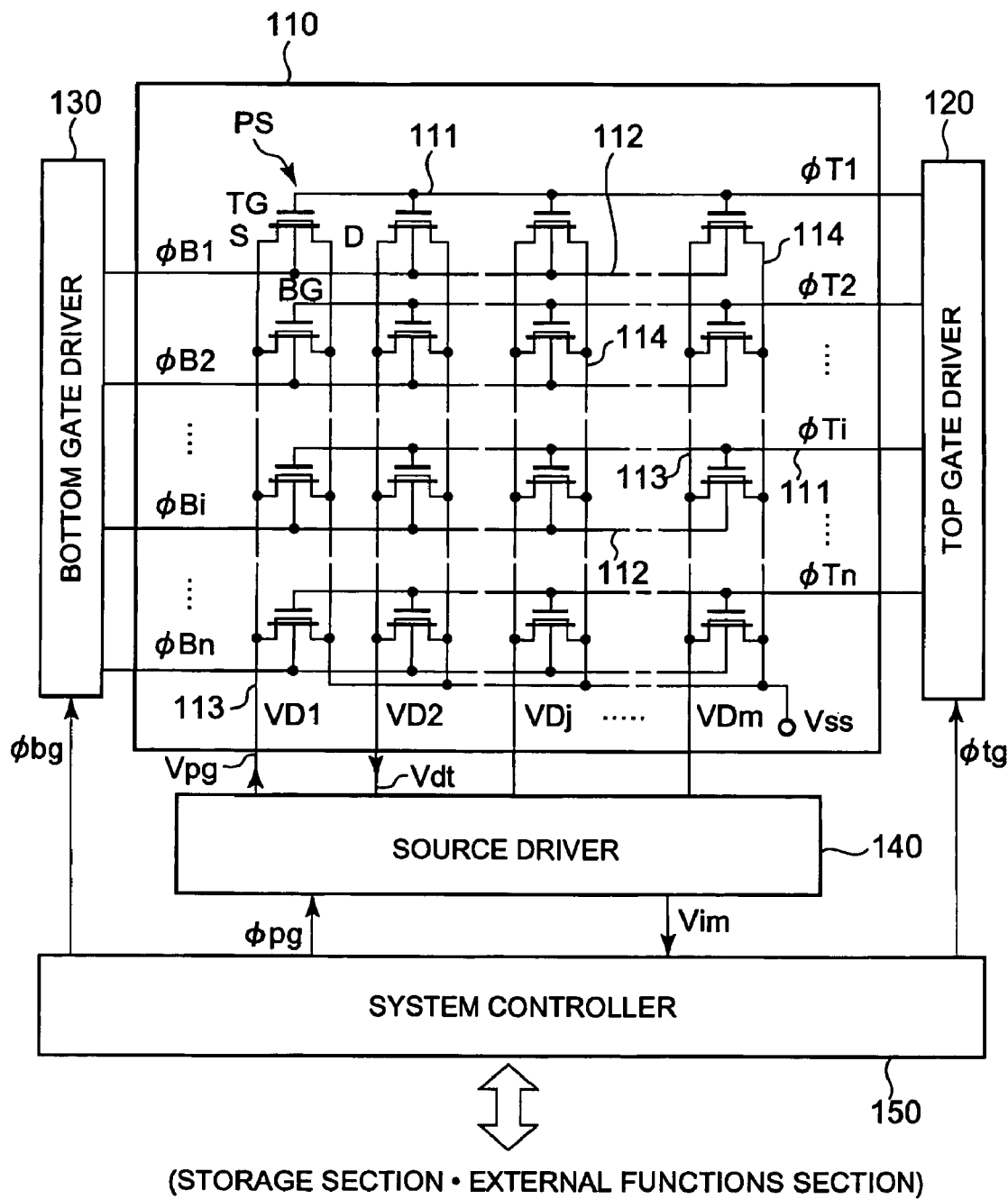
FIG. 8 is an outline configuration diagram showing an example of the entire configuration of the image reading apparatus provided with the driver circuits related to the present invention.

FIG. 8 is an outline configuration diagram showing an example of the entire configuration of the image reading apparatus provided with the driver circuits related to the present invention.

The image reading apparatus related to the present invention, as seen in FIG. 8, has an outline configuration comprising a photosensor array 110, a top gate driver 120, a bottom gate driver 130, a source driver 140 and a system controller 150. The photosensor array 110 has a two-dimensional array (for example, a matrix form arrayed in n rows×m columns) of the above-mentioned double-gate type photosensors PS. The top gate driver 120 (scanning driver circuit) outputs sequential scanning signals ØTi (reset pulses described later: i=optional natural numbers; i=1, 2, . . . n) to each of the top gate lines 111 (scanning lines). The bottom gate driver 130 (scanning driver circuit) is connected to the bottom gate lines 112 which connect and extend the bottom gate terminals BG (equivalent to the above bottom gate electrode BGx) of each of the photosensors PS in the row writing direction and outputs sequential scanning signals ØBi (read-out pulses described later) to each of the bottom gate lines 112. The source driver 140 (signal driver circuit) is connected to the source lines 113 (corresponds to the read-out lines Lread described in each of the above-mentioned embodiments) which connect and extend the source terminal S of each of the double-gate type photosensors PS in the column writing direction, wherein upon a precharge voltage Vpg being applied to each of the photosensors PS via the source lines 113, reads-out the source line voltages VDj (=data voltage Vdt: j=optional natural numbers; j=1, 2, . . . m; corresponds to the detection signals Vread described in each of the above-mentioned embodiments) corresponding to the carriers stored in each of the photosensors PS. The system controller 150 comprises at least the capability to exchange image data Vim (corresponds to the read data Vdata described in each of the preferred embodiments) acquired via the source driver 140 between external function sections for executing predetermined processing, such as for a storage section (not shown), image data processing, collation, etc, while various control signals Øtg, Øbg, Øpg for controlling the read operation of a detectable object imaged by the photosensor array 110 are respectively supplied to the above-stated top gate driver 120, the bottom gate driver 130 and the source driver 140.

Additionally, in the photosensor array 110, the drain lines 114 (common lines) respectively connect the drain terminals D of each of the double-gate type photosensors PS in common to the predetermined low voltage Vss (for example, ground potential).

Hereinafter, the top gate driver 120, the bottom gate driver 130 and the source driver 140 applicable to the above-mentioned image reading apparatus will be explained in detail.

(Top Gate Driver/Bottom Gate Driver)

Figure 9:
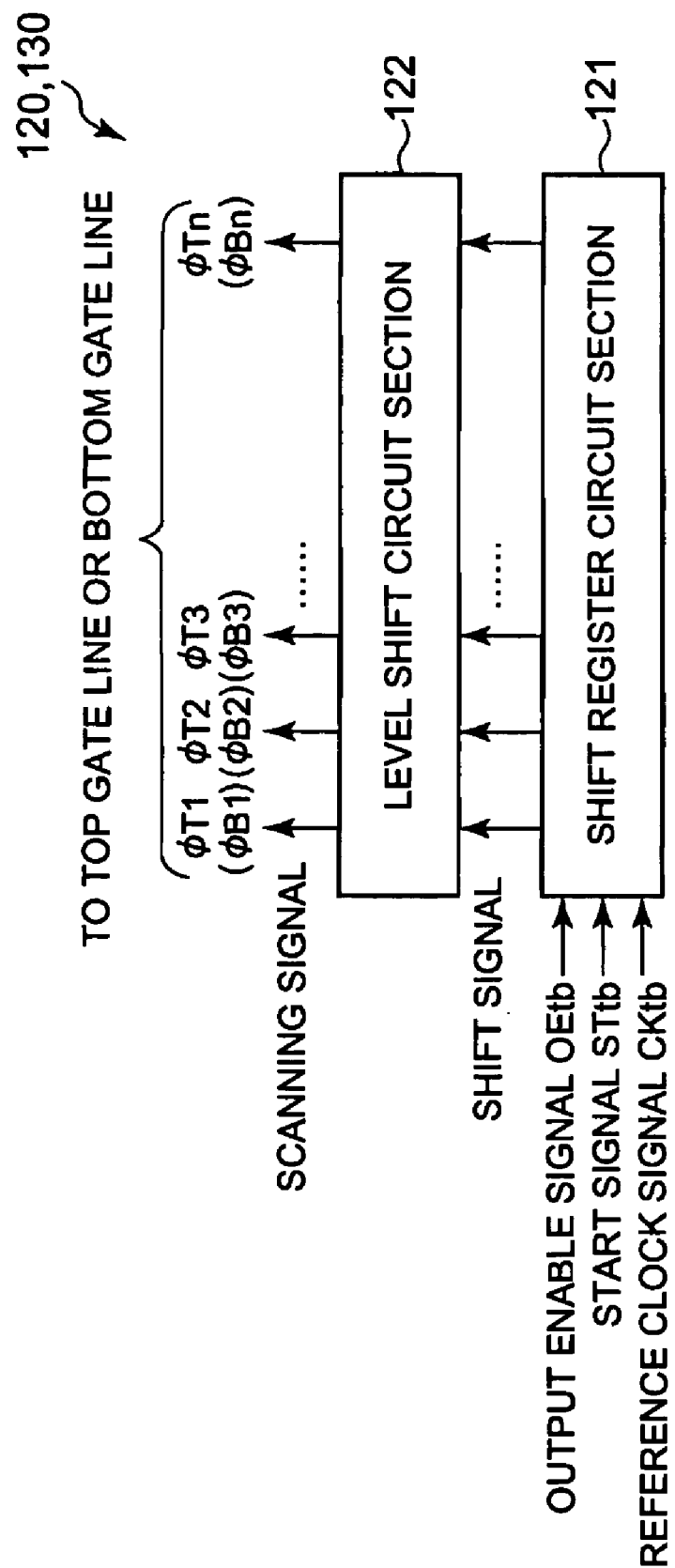
FIG. 9 is a schematic block diagram showing one configuration example of the top gate driver or bottom gate driver applicable to the image reading apparatus related to the present invention.

FIG. 9 is a schematic block diagram showing one configuration example of the top gate driver or bottom gate driver applicable to the image reading apparatus related to the present invention.

Here, since the top gate driver 120 and the bottom gate driver 130 have an equivalent configuration, both are combined and explained together.

Referring to FIG. 9, the top gate driver 120 or the bottom gate driver 130, for example, have a configuration comprising a shift register circuit section 121 and a level shift circuit section 122. The shift register circuit section 121 outputs the shift signals Sout1, Sout2, . . . Soutn, Soutd corresponding to each of the top gate lines 111 or the bottom gate lines 112 for every row of the photosensor array 110 while sequentially shifting a start signal STtb based on the start signal STtb, a reference clock signal CKb and an output enable signal OEtb, etc. supplied as control signals Øtg or Øbg from the system controller 150. The level shift circuit section 122 respectively amplifies to a predetermined signal level the shift signals Sout1, Sout2, . . . Soutn which are sequentially received from the shift register circuit section 121 as scanning signals (reset pulses ØTi or read-out pulses ØBi described later) and subsequently outputs to each of the top gate lines 111 or the bottom gate lines 112.

(First Configuration Example of Source Driver)

Figure 10:
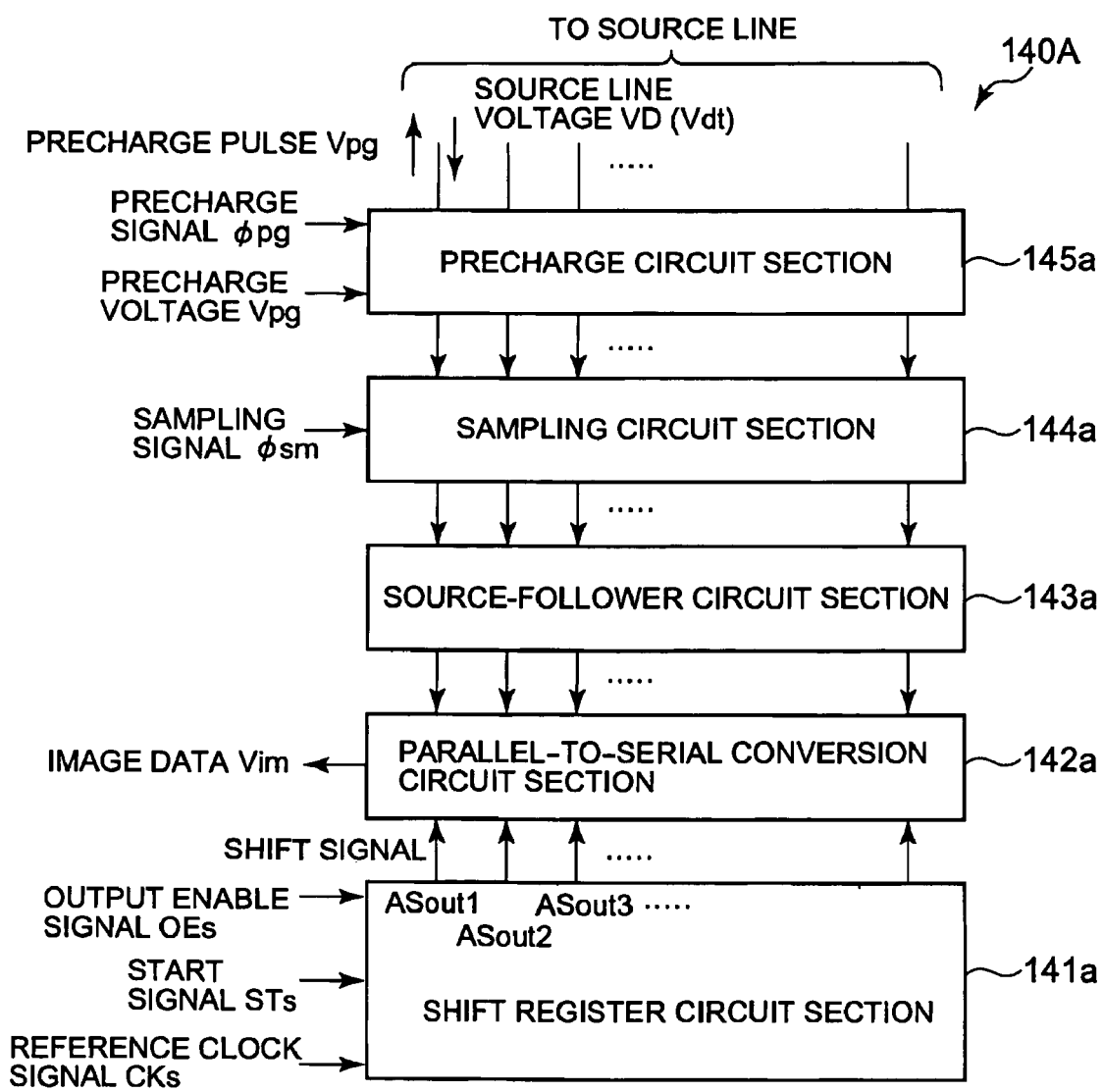
FIG. 10 is a schematic block diagram showing the first configuration example of the source driver applicable to the image reading apparatus related to the present invention.

FIG. 10 is a schematic block diagram showing the first configuration example of the source driver applicable to the image reading apparatus related to the present invention.

Figure 11:
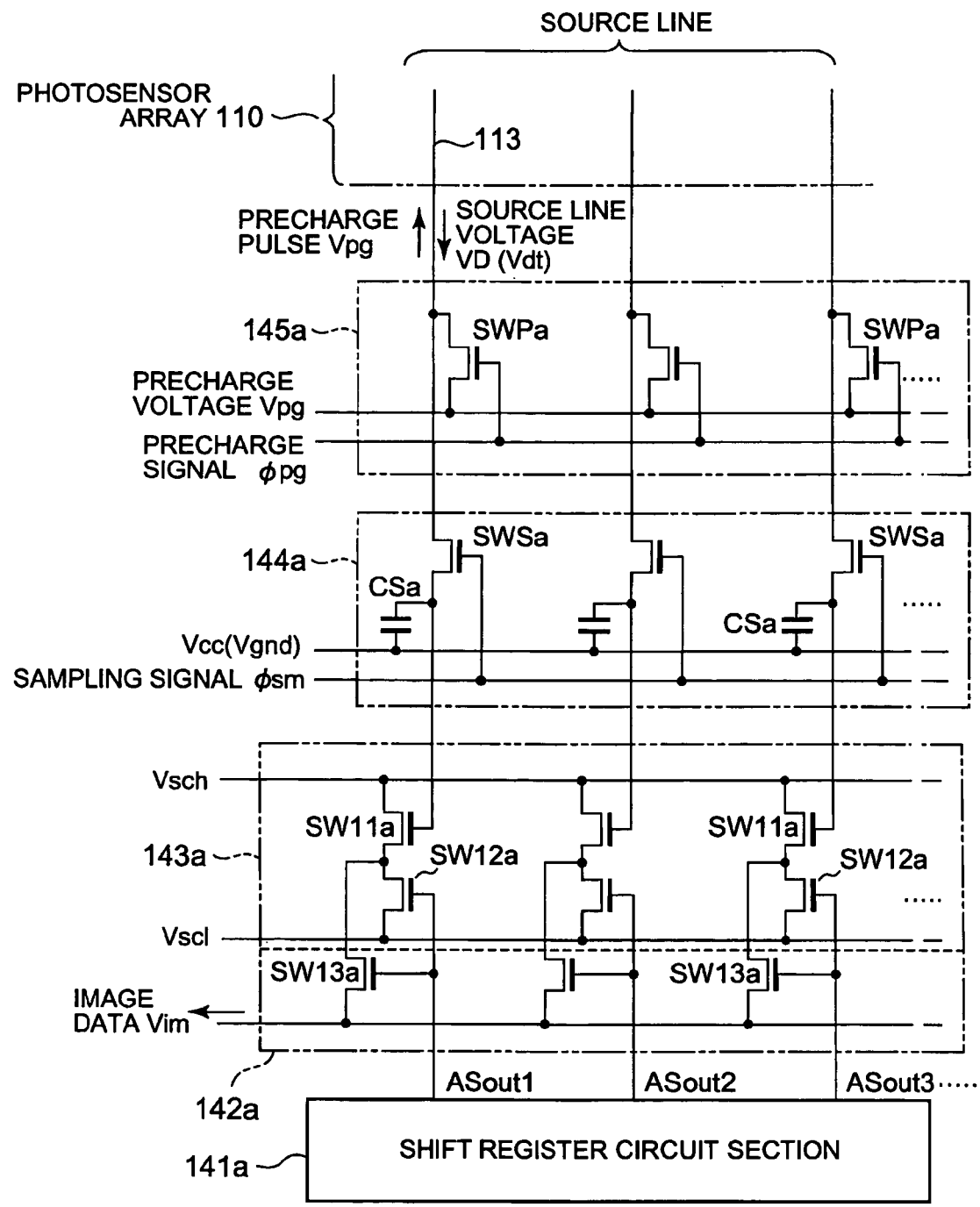
FIG. 11 is a circuit diagram showing the concrete configuration of the source driver related to the first configuration example.

FIG. 11 is a circuit diagram showing the concrete configuration of the source driver related to the first configuration example.

Also, in FIG. 11, with respect to any configuration equivalent to the driver circuit mentioned above, the equivalent or same nomenclature is appended.

As seen in FIG. 10 and FIG. 11, the source driver 140A related to the first configuration example has an outline configuration comprising, at least, a shift register circuit section 141a, a precharge circuit section 145a, a sampling circuit section 144a, a source follower circuit section 143a and a parallel-to-serial conversion circuit section 142a. The shift register circuit section 141a (shift signal generator) (corresponds to the shift register SRT described in each of the above-mentioned preferred embodiments) outputs the shift signals ASout1, Asout2, . . . ASoutm corresponding to each the source lines 113 for every column of the photosensor array 110 while sequentially shifting the start signal STs based on the start signal STs, the reference clock signal CKs and the output enable signal OEs, etc. supplied as control signals from the system controller 150. The precharge circuit section 145a (precharge means) comprises a switch group SWPa (thin-film transistors) which simultaneously apply predetermined precharge pulses (precharge voltage Vpg) to each of the source lines 113 at timing based on the precharge signals Øpg supplied as control signals from the system controller 150. The sampling circuit section 144a comprises a switch group SWSa which reads in parallel the source line voltage VD (detection voltage Vdt) corresponding to the carriers stored in each of the photosensors PS via each of the source lines 113 and a capacitative element group CSa (or parasitic capacitance) which holds this source line voltage VD. The source follower circuit section 143a (corresponds to the current controller and the amplifier) comprises a plurality of source follower amplifier circuits which provide a series connection for the driver side switching element SW11a and the load switching element SW12a and amplifying the source line voltage VD maintained in the above-mentioned capacitative element group CSa to a predetermined signal level. The parallel-serial conversion circuit section 142a (corresponds to the data converter) comprises an output control switch group SW13a which extract in time series the source line voltage VD outputted (amplified) from the source follower circuit section 143a, convert into serial data and output as the image data Vim (corresponds to the read data Vdata described in each of the above-mentioned preferred embodiments).

Here, the composition structure of the source follower circuit section 143a, the parallel-to-serial conversion circuit section 142a and the shift register circuit section 141a in the source driver 140A related to this configuration example can be applied to the configuration of any of the driver circuits described in the above-mentioned first through fourth preferred embodiments. Specifically, the circuit configuration RDa constituted with the driver side switching element SW11a, the load side switching element SW12a and the output control switch SW13a provided for every column (source lines) in the source follower circuit section 143a and the parallel-to-serial conversion circuit section 142a, respectively, can be applied to any configuration of the read-out circuit sections RDAx~RDDx described in the above-stated first through fourth preferred embodiments. Also, in FIG. 11, the case of applying the driver circuit (refer to FIG. 1) described in the first preferred embodiment is shown.

According to the source driver 140A having such a configuration, based on the sampling signal Øsr supplied from the system controller 150, the source line voltage VD is collectively extracted and maintained via each of the source lines 113 from the first column through the m column. Then, based on the shift signals ASoutj sequentially outputted from the shift register circuit section 141a, the source line voltage VD (detection voltage Vdt) is amplified to a predetermined signal level, converted into a serial signal and outputted as the image data Vim. Also, electrical current only flows through the circuit section which is executing the amplification processing and the serial conversion processing in the source follower circuit section 143a and the parallel-to-serial conversion circuit section 142a. The electric current supply to the other circuit sections is shut off. Thus, power consumption and the amount of heat generation can be suppressed.

(Second Configuration Example of Source Driver)

Figure 12:
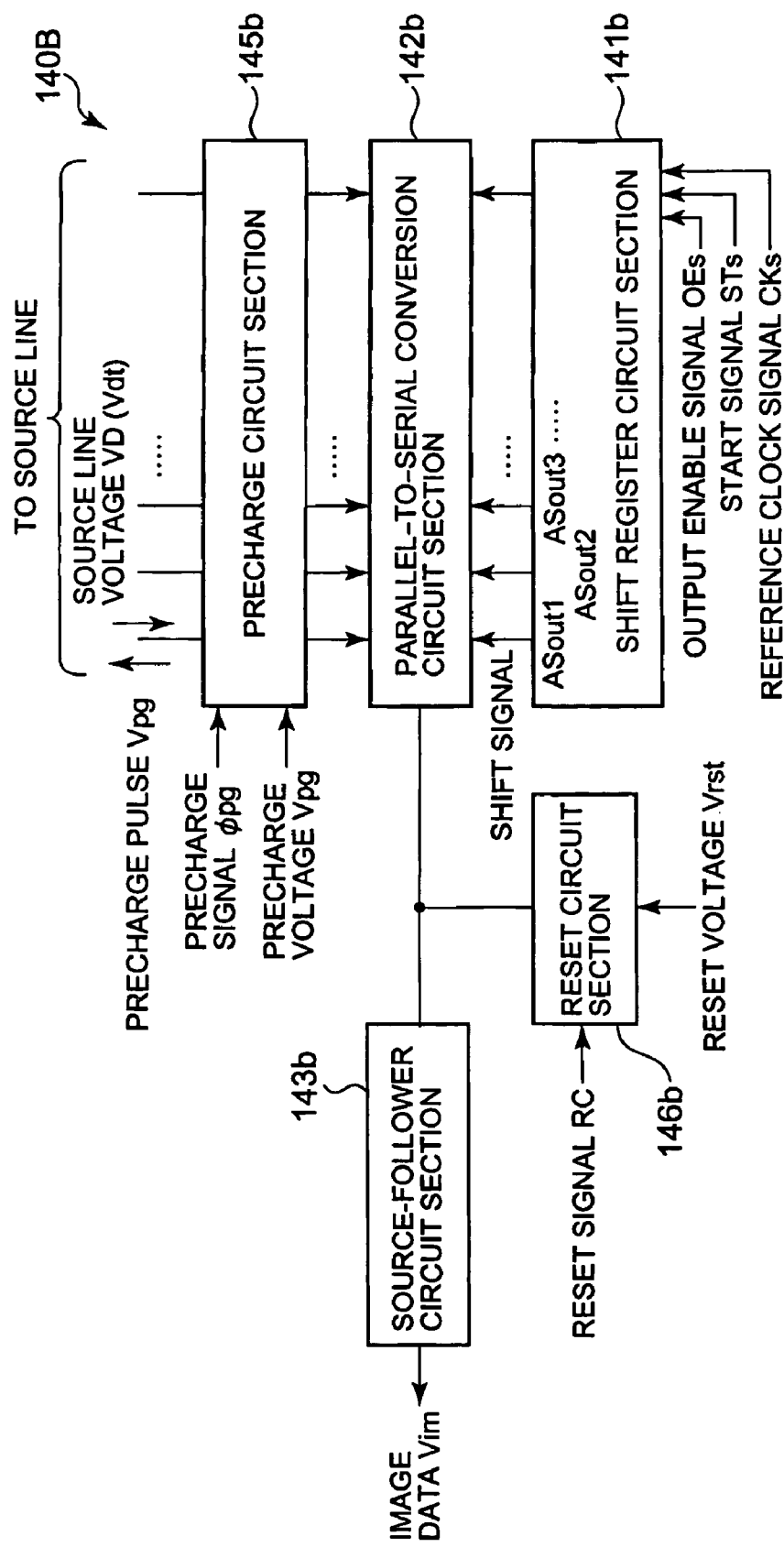
FIG. 12 is a schematic block diagram showing the second configuration example of the source driver applicable to the image reading apparatus related to the present invention.

FIG. 12 is a schematic block diagram showing the second configuration example of the source driver applicable to the image reading apparatus related to the present invention.

Figure 13:
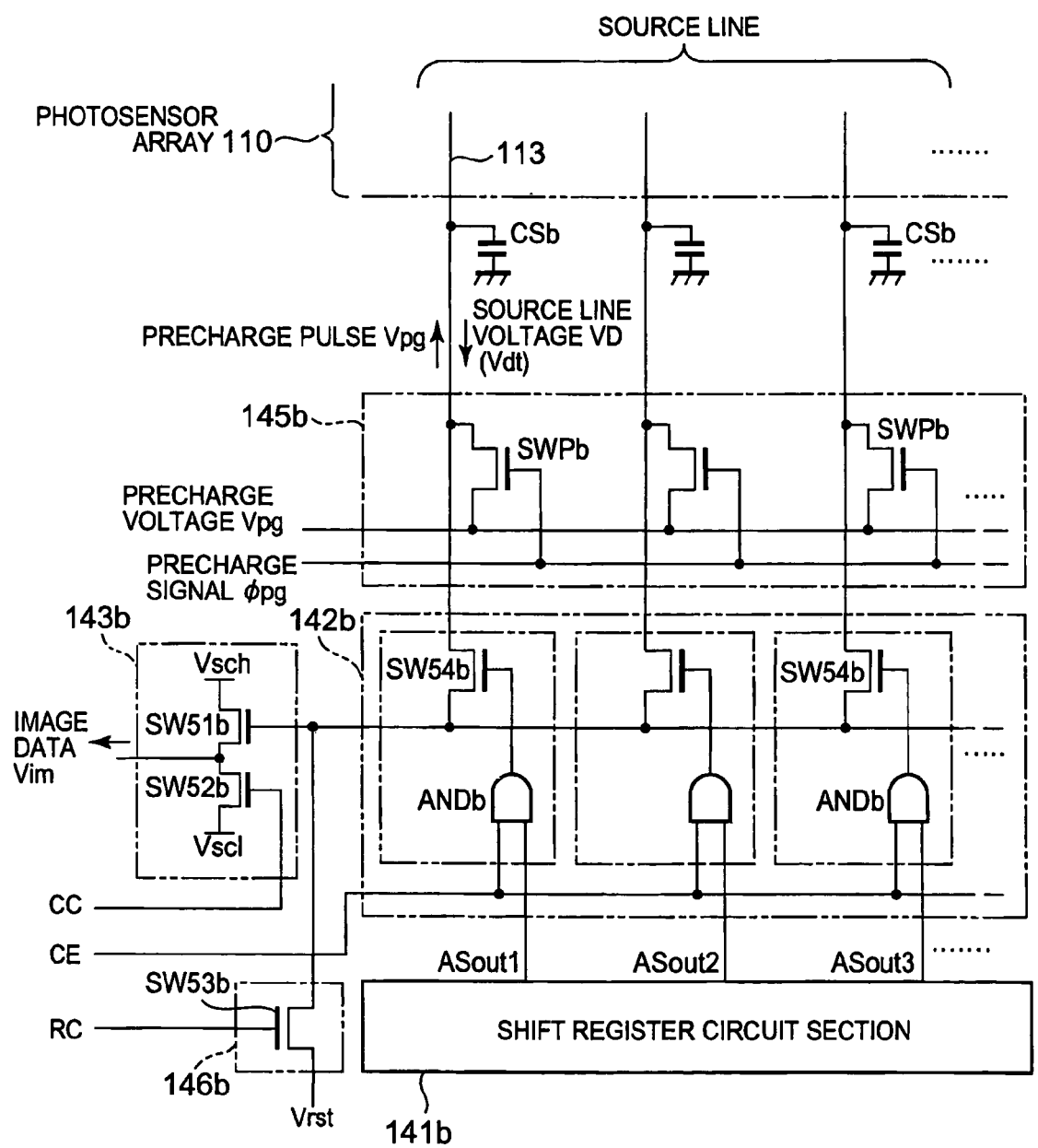
FIG. 13 is a circuit diagram showing the concrete configuration of the source driver related to the second configuration example.

FIG. 13 is a circuit diagram showing the concrete configuration of the source driver related to the second configuration example.

Here, with respect to any configuration equivalent to the first configuration example describing a configuration equivalent to the above-stated driver circuit, the equivalent or same nomenclature is appended and explained.

As seen in FIG. 12 and FIG. 13, the source driver 140B related to the second configuration example has an outline configuration comprising a shift register circuit section 141b, a precharge circuit section 145b, a parallel-to-serial conversion circuit section 142b, a source follower circuit section 143b and a reset circuit section 146b. The shift register circuit section 141b (shift signal generator) and the precharge circuit section 145b (precharge means) have a configuration equivalent (refer to FIG. 10 and FIG. 11) to the source driver 140A related to the above-mentioned first configuration example. The parallel-to-serial conversion circuit section 142b (data converter) comprises a read-out control switch group SW54b and an AND circuit group ANDb which serially extract and convert into serial data at timing based on the shift signals ASout1, ASout2, . . . ASoutm from the shift register circuit section 141b. A source follower circuit section 143b (amplifier) comprising a single source follower amplifier circuit which provides a series connection for the driver side switching element SW51b and the load side switching element SW52b. The above-mentioned serial data is amplified to a predetermined signal level and outputted as the image data Vim. The reset circuit section 146b (signal resetting means) comprises a reset switch SW53b for initializing at a predetermined time interval the signal level of the above-mentioned signal data outputted from the parallel-to-serial conversion circuit 142b.

Here, the parallel-to-serial conversion circuit 142b corresponds to the read-out circuit sections RDEx described in the above-mentioned fifth preferred embodiment. The source follower circuit section 143b corresponds to the amplification circuit section AMPx described in the above-mentioned fifth preferred embodiment. The reset circuit section 146b corresponds to the reset circuit section RST described in the above-mentioned fifth preferred embodiment. Also, the composition structure of the source follower circuit section 143b, the parallel-to-serial conversion circuit 142b, the shift register circuit section 141b and the reset circuit section 146b can be applied to the configuration of the driver circuit described in the above-mentioned fifth preferred embodiment. Specifically, the circuit configuration RDb constituted with the read-out control switch group SW54b and the AND circuit group ANDb provided for every column (source lines) in the parallel-to-serial conversion circuit section 142b can be applied to the read-out circuit sections RDEx described in the above-stated fifth preferred embodiment.

According to the source driver 140B having such a configuration, the source line voltage VD (detection voltage Vdt) is maintained in the capacitative element CSb connected to each of the source lines 113 and at timing based on the shift signals ASoutj is sequentially outputted from the shift register circuit section 141*b*. Then, the above-mentioned source line voltage VD is sequentially read from the first column through the m column, converted into a serial signal, amplified to a predetermined signal level via the single source follower circuit 143*b* and outputted as the image data Vim. Also, in the time interval between each signal comprising a serial signal, the electric current supply in the source follower circuit section 143*b* is shut off. Thus, power consumption and the amount of heat generation can be significantly suppressed.

(Drive Control Method of the Image Reading Apparatus)

Next, the drive control method of the photosensor system (image reading apparatus) having the configuration described above will be briefly explained with reference to the drawings.

Figure 14:
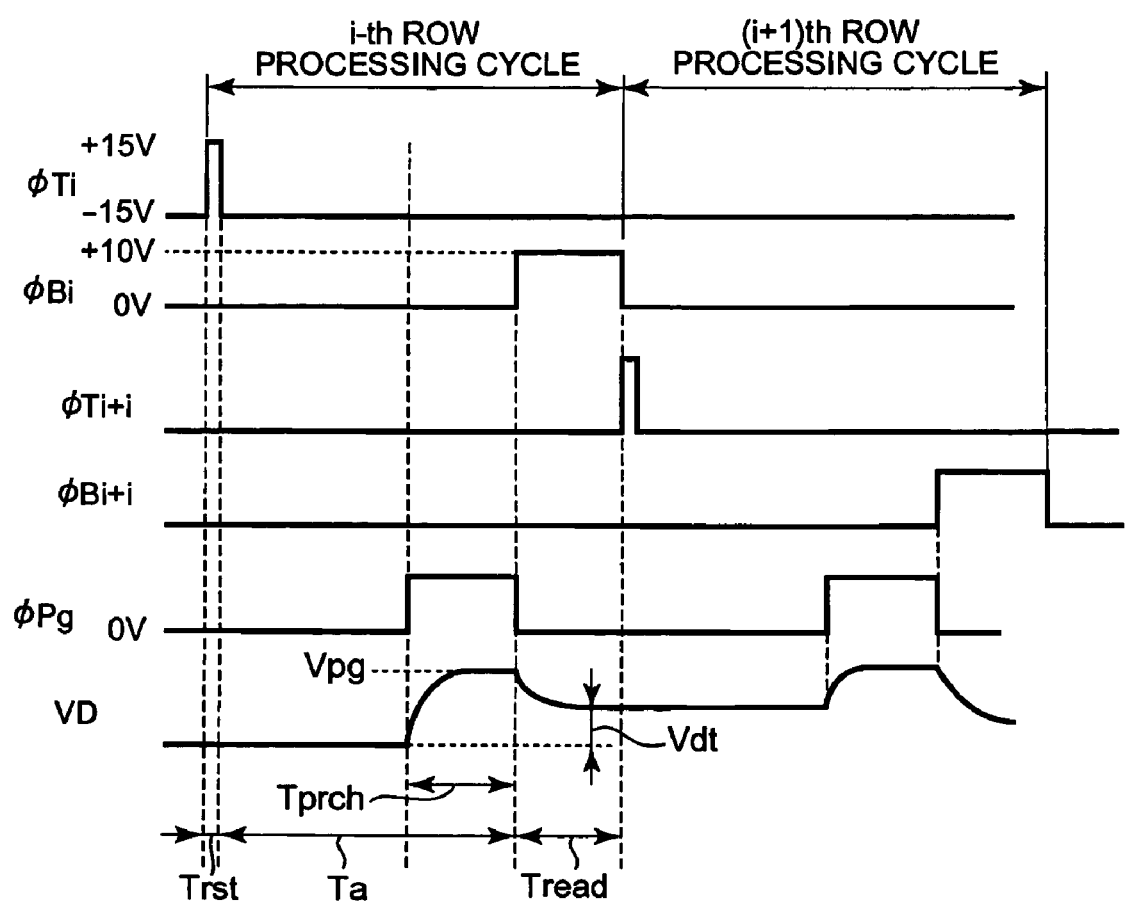
FIG. 14 is a timing chart showing an example of the drive control method for the photosensor array applied to the image reading apparatus related to the present invention.

FIG. 14 is a timing chart showing an example of the drive control method for the photosensor array applied to the image reading apparatus related to the present invention.

Figure 15:
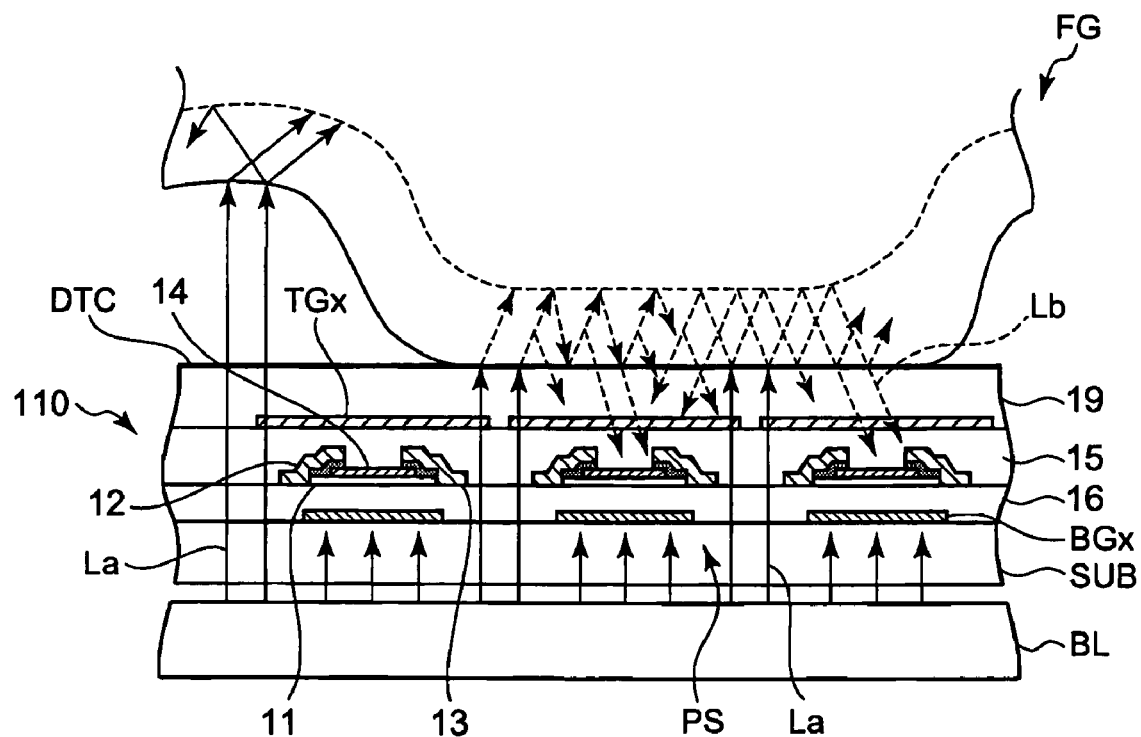
FIG. 15 is a substantial part cross-sectional view diagram in the case of applying the image reading apparatus related to the present invention to a fingerprint reading apparatus.
Figure 16:
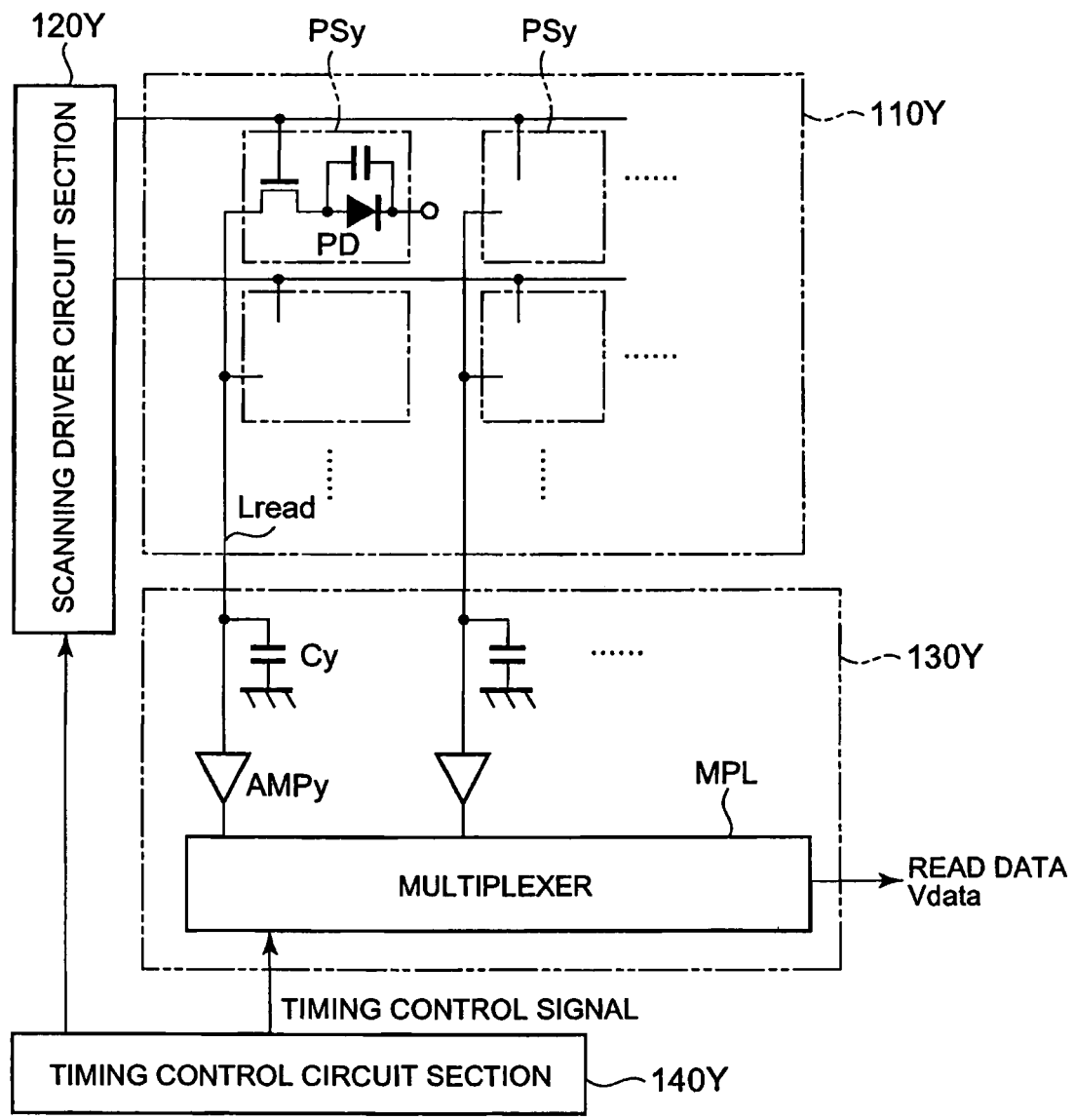
FIG. 16 is an outline configuration diagram showing one example of a conventional prior art image reading apparatus.
Figure 17:
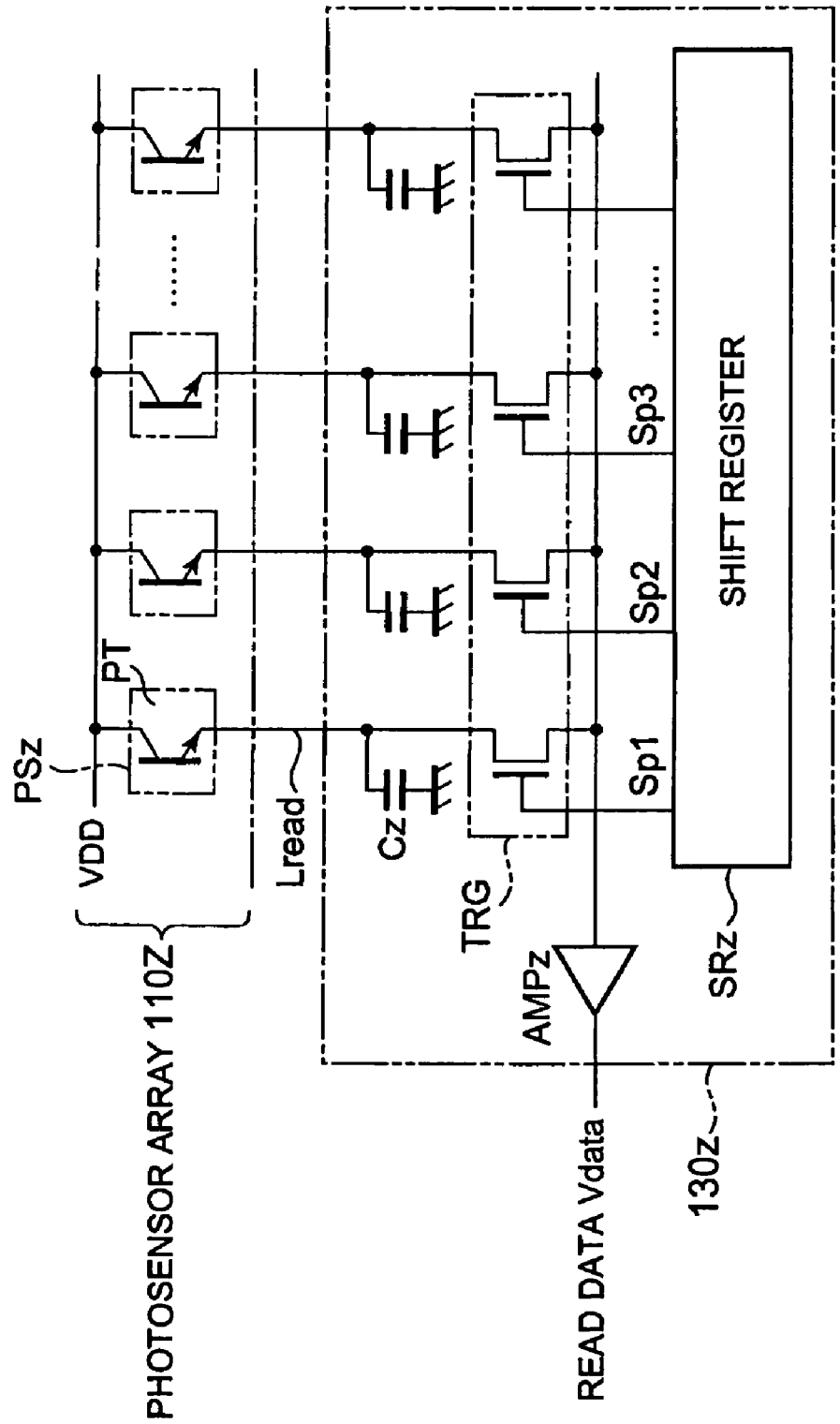
FIG. 17 is an outline configuration diagram showing another example of a conventional prior art image reading apparatus.

FIG. 15 is a substantial part cross-sectional view diagram in the case of applying the image reading apparatus related to the present invention to a fingerprint reading apparatus.

Here, a case where a fingerprint is read will be explained as the drive control method of the photosensor array. Also, in FIG. 15, a portion of the hatching showing the cross-sectional part of the photosensor array has been omitted for convenience of explanation.

The basic drive control of the above-mentioned photosensor array 110, as shown in FIG. 14, is actualized by setting a reset period Trst, a charge storage period Ta, a precharge period Tprch and a read-out period Tread as a predetermined processing operation period (processing cycle).

As seen in FIG. 14, initially, in the reset period Trst, a reset pulse ØTi (for example, high-level top gate voltage (=reset pulse voltage Vtg=+15V) is applied to the top gate terminals TG of the photosensors PS for the i-th rows via the top gate lines 111 by the top gate driver 120 and a reset operation (initialization operation) which emits the carriers (electron-holes) stored in the semiconductor layer 11 is executed.

Next, in the charge storage period Ta, by applying a low-level bias voltage ØTi (for example, top gate voltage Vtg=−15V) to the top gate terminals TG by the top gate driver 120, the above-stated reset operation is terminated and a charge storage operation is (carrier accumulation operation) commenced.

Here, in the charge storage period Ta, as shown in FIG. 15, light La is irradiated toward a detectable object FG (for example, a finger) placed firmly on a detection surface DTC (upper surface of the photosensor array 110) from backlight BL (light source) formed underneath the transparent insulating substrate SUB on which the double-gate photosensors PS are formed, as shown in FIG. 7. The reflected light Lb crosses the top gate electrode TGx composed of a transparent electrode layer and enters into the semiconductor layer 11. Accordingly, corresponding to the light intensity which enters into the semiconductor layer 11 during the charge storage period Ta, an electron-hole is induced in the incidence effective area (carrier generation region) of the semiconductor layer 11 and the electron-hole is stored near the interface (channel region boundary) of the semiconductor layer 11 and the block insulating layer 14.

Subsequently, in the precharge period Tprch, precharge pulses (for example, precharge voltage Vpg=+5V) are applied to the source terminals S and a precharge operation is executed which stores an electric charge in the source electrode 12 via the source lines 113 based on the precharge signals Øpg by the source driver 140 in parallel to the above-stated charge storage period Ta. Also, in this precharge period Tprch, the shift signals are not outputted from the shift register circuit sections 141*a* and 141*b* of the source driver 140. Accordingly, at least, the circuit configurations RDa, RDb (read-out circuit sections) formed with each of the source lines 113 are set in an "OFF" state (non-operational state).

Next, in the read-out period Tread, after elapsing the above-stated precharge period Tprch, by applying a read-out pulse ØBi (for example, high-level of read-out pulse voltage Vbg=+10V (=read-out pulse voltage)) to the bottom gate terminals BG via the bottom gate lines 112 by the bottom gate driver 130, a read-out operation is executed which reads the source line voltage VD (detection voltage Vdt) corresponding to the carriers (electron-holes) stored in the channel region in the charge storage period Ta by the source driver 140.

Here, there is a source line voltage VD (detection voltage Vdt) change tendency in an applied period (read-out period; third step) of the read-out pulses ØBi in which the detection voltage Vdt shows a tendency to decline sharply when there are many stored carriers (bright condition) in the charge storage period Ta, and conversely shows a tendency to decline gradually when there are few stored carriers (dark condition). For example, the luminosity data (brightness and darkness information) corresponding to the light volume which enters the double-gate type photosensors PS, namely the shade pattern of a detectable object, is detectable by detecting the detection voltage Vdt after a predetermined elapsed time period from the start of the read-out period Tread.

Further, the read-out operation of the source line voltage VD (detection voltage Vdt) by the source driver 140 in the read-out period Tread is identical to the cases described in each of the preferred embodiments. For example, in the case of having the configuration as shown in FIG. 10~FIG. 11 in which from among the read-out circuit sections RDa provided for every column (source lines 113) of the photosensor array 110, amplification processing of the source line voltage VD (detection voltage Vdt) is executed by the source follower amplifier circuit composed of the driver side switching element SW11*a* and the load side switching element SW12*a* and outputted only in the read-out circuit sections RDa that are supplied with the shift signals ASoutj from the shift register circuit section 141*a*. Also, as for the detection signals Vdt which receive amplification processing, by executing sequential processing for every column based on the output timing of the shift signals ASoutj from the shift register circuit section 141*a*, image data Vim for one row portions (i-th rows) of a detectable object image (fingerprint image) is acquired as time series data.

Also, in cases where the source driver 140 has the configuration as shown in FIG. 12~FIG. 13, from among the read-out circuit sections RDb provided for every column (source lines 113) of the photosensor array 110, by performing sequential execution operations, the source line voltage VD (detection voltage Vdt) outputs via the output control switch group SW13*a* only in the read-out circuit sections RDb that are supplied with the shift signals ASoutj from the shift register circuit section 141*b*. The source line voltage VD is converted into time series data and synchronized with the time series of this source line voltage VD by the source follower amplifier circuit composed of the driver side switching element SW11*b* and the load side switching element SW12*b*. By executing sequential amplification processing of the source line voltage VD (detection voltage Vdt), image data Vim for one row portions (i-th rows) of a detectable object image (fingerprint image) is acquired.

Also, in a manner such as seen in FIG. 14, by performing repeated execution of equivalent operation processes for each of the rows (i, i+1, . . . ) of the above-mentioned photosensor array 110 sequentially at predetermined timing, for example, a series of detection voltage Vdt detection operations (read operation of the image data Vim in i-th rows constituting a reset operation a charge storage operation and a precharge operation→read-out operation) relative to specified rows (i-th rows) as one cycle, a monochrome type image reading apparatus for reading a two-dimensional image (fingerprint image for one screen portion) of a detectable object by the photosensor array 110 composed of the double-gate type photosensors PS can be realized.

Accordingly, by applying the driver circuit explained in the above-stated first through fourth preferred embodiments to the source driver of the above-described image reading apparatus, the detection signals corresponding to a detectable object image pattern are read in parallel from each double-gate type photosensors arranged in the photosensor array. Upon applying amplification processing individually, amplifying to a predetermined signal level, converting into time series data and synchronizing to parallel-to-serial conversion processing timing, only the amplification circuit for the source follower circuit section set corresponding to each of the source lines (read-out lines) performs an "ON" operation (drive) and electrical current flows and controlled so that the other amplification circuits perform an "OFF" operation and electrical current is shut off. Specifically, processing is controlled so that only any one of the amplification circuits performs drive from among the plurality of amplification circuits provided for every column of the source driver. At the time of the read operation of a detectable object image, power consumption and the amount of heat generation in the source drive is markedly suppressed. In view of this, the image reading apparatus of the present invention can be achieved.

Additionally, by applying the driver circuit explained in the above-stated fifth preferred embodiment to the source driver of the above-described image reading apparatus, the detection signals corresponding to a detectable object image are read in parallel from each of the double-gate type photosensors arranged in the photosensor array. Upon converting into time series data and sequentially amplifying to a predetermined signal level, processing synchronizes to parallel-to-serial conversion processing timing (time series timing). The single amplifier provided in the source follower circuit section intermittently performs an "ON" operation (drive) and electrical current flows. Since processing is controlled (namely, the detection signal group outputs in time series and controls so that the amplification circuit drives only according to timing in which each of the detection signals exists) so that during time intervals in which the detection signals are not outputted, the amplification circuit performs an "OFF" operation and electrical current is shut off. At the time of the read operation of a detectable object image, power consumption in the source drive is markedly suppressed. In view of this, the image reading apparatus of the present invention can be achieved.

While the present invention has been described with reference to the preferred embodiments, it is intended that the invention be not limited by any of the details of the description therein but includes all the embodiments which fall within the scope of the appended claims.

What is claimed is:

1. A driver circuit, comprising:
   a shift signal generator for sequentially outputting shift signals at a predetermined time interval;
   a plurality of amplifiers for respectively receiving a plurality of detection signals read out in parallel corresponding to a detectable object image pattern and respectively receiving the shift signals, wherein the plurality of amplifiers respectively amplify and output the detection signals inputted thereto based on an output timing of each of the shift signals inputted thereto;
   a plurality of current controllers respectively corresponding to the plurality of amplifiers, for individually controlling a supply state of electrical current to each of the amplifiers based on the output timing of each of the shift signals; and
   a data converter for outputting in time series each of the amplified detection signals outputted from each of the amplifiers based on the output timing of each of the shift signals and for generating time series read data;
   wherein each of the current controllers comprises means for setting the amplifier corresponding to the current controller in a drive state when the amplifier is supplied with one of the shift signals by the shift signal generator and for setting the amplifier in a non-drive state when the amplifier is not supplied with one of the shift signals; and
   wherein each of the amplifiers comprises a first transistor element and a second transistor element coupled in series to form a current path between terminals of a predetermined supply voltage, wherein a signal based on the received detection signal is applied to a control terminal of the first transistor element, and wherein the amplified detection signal is outputted from a junction point in the current path of the first transistor element and the second transistor element.

2. The driver circuit according to claim 1, wherein each of the amplifiers comprises a source follower amplifier circuit.

3. The driver circuit according to claim 1, wherein each of the current controllers further comprises means for applying a signal based on the received shift signal to a control terminal of the second transistor element; and
   wherein a signal level of the signal applied to the control terminal of the second transistor element when the amplifier corresponding to the current controller is supplied with one of the shift signals is such that the second transistor element reaches an "ON" state, and the signal level of the signal applied to the control terminal of the second transistor element when the amplifier is not supplied with one of the shift signals is such that the second transistor element reaches an "OFF" state.

4. The driver circuit according to claim 1, wherein each of the current controllers further comprises means for controlling a signal level of the signal applied to the control terminal of the first transistor element based on the received shift signal; and
   wherein the signal level of the signal applied to the control terminal of the first transistor element when the amplifier corresponding to the current controller is not supplied with one of the shift signals is such that the first transistor element reaches an "OFF" state.

5. The driver circuit according to claim 1, wherein each of the current controllers further comprises:
   a current control switch coupled in series with the first transistor element and the second transistor element between the terminals of the predetermined supply voltage; and
   means for setting the current control switch in an "ON" state when the amplifier corresponding to the current controller is supplied with one of the shift signals and for setting the current control switch in an "OFF" state when the amplifier is not supplied with one of the shift signals.

6. The driver circuit according to claim 1, wherein the data converter comprises a plurality of output control switches respectively corresponding to the plurality of amplifiers for outputting the amplified detection signals in synchronization with the amplifiers.

7. A driver circuit, comprising:
a shift signal generator for sequentially outputting shift signals at a predetermined time interval;
a data converter corresponding to each of a plurality of detection signals read out in parallel according to a detectable object image pattern and respectively receiving the shift signals, wherein the detection signals are outputted in time series based on an output timing of each of the shift signals;
an amplifier for receiving each of the detection signals in time series from the data converter, and sequentially amplifying each of the detection signals to a predetermined signal level, wherein the amplifier generates and outputs time series read data; and
a current controller for controlling a supply state of electrical current to the amplifier corresponding to a timing of the detection signals outputted in time series;
wherein the amplifier comprises a first transistor element and a second transistor element coupled in series to form a current path between terminals of a predetermined supply voltage;
wherein the detection signals outputted in time series are applied to a control terminal of the first transistor element, and the read data is outputted from a junction point in the current path of the first transistor element and the second transistor element; and
wherein the current controller performs control such that a signal level of a signal applied to a control terminal of the second transistor element is such that the second transistor element reaches an "OFF" state at a timing between each of the detection signals outputted in time series.

8. The driver circuit according to claim 7, wherein the amplifier comprises a source follower amplifier circuit.

9. The driver circuit according to claim 7, further comprising signal resetting means for initializing a signal level of a signal applied to the amplifier at the timing between each of the detection signals.

10. A driver circuit, comprising:
a shift signal generator for sequentially outputting shift signals at a predetermined time interval;
a data converter corresponding to each of a plurality of detection signals read out in parallel according to a detectable object image pattern and respectively receiving the shift signals, wherein the detection signals are outputted in time series based on an output timing of each of the shift signals;
an amplifier for receiving each of the detection signals in time series from the data converter, and sequentially amplifying each of the detection signals to a predetermined signal level, wherein the amplifier generates and outputs time series read data;
a current controller for controlling a supply state of electrical current to the amplifier corresponding to a timing of the detection signals outputted in time series; and
signal resetting means for initializing a signal level of a signal applied to the amplifier at a timing between each of the detection signals;
wherein the amplifier comprises a first transistor element and a second transistor element coupled in series to form a current path between terminals of a predetermined supply voltage;
wherein the detection signals outputted in time series are applied to a control terminal of the first transistor element, and the read data is outputted from a junction point in the current path of the first transistor element and the second transistor element; and
wherein the signal resetting means comprises means for setting the signal level of the signal applied to the amplifier, which is applied to the control terminal of the first transistor element, such that a predetermined reset voltage of the first transistor element reaches an "OFF" state at the timing between each of the detection signals.

11. The driver circuit according to claim 10, wherein the signal resetting means comprises a third transistor element which applies a control signal corresponding to the timing between each of the detection signals, wherein one end of a current path of the third transistor element is connected to the control terminal of the first transistor element and another end of the current path of the third transistor element is connected to a control terminal of the reset voltage.

12. An image reading apparatus, comprising:
a photosensor array comprising a plurality of photosensors arrayed in a matrix form;
a scanning driver circuit which outputs a scanning signal for simultaneously setting in a selective state the plurality of photosensors in a row of the photosensor array;
a signal driver circuit which reads out in parallel a plurality of detection signals corresponding to a detectable object image placed upon the photosensor array from each of the photosensors set in the selective state by the scanning driver circuit;
wherein the signal driver circuit comprises:
a shift signal generator for sequentially outputting shift signals at a predetermined time interval;
a plurality of amplifiers for respectively receiving the plurality of detection signals and respectively receiving the shift signals, wherein the plurality of amplifiers respectively amplify and output the detection signals inputted thereto based on an output timing of each of the shift signals inputted thereto;
a plurality of current controllers respectively corresponding to the plurality of amplifiers, for individually controlling a supply state of electrical current to each of the amplifiers based on the output timing of each of the shift signals; and
a data converter for outputting in time series each of the amplified detection signals outputted from each of the amplifiers based on the output timing of each of the shift signals and for generating time series read data;
wherein each of the current controllers comprises means for setting the amplifier corresponding to the current controller in a drive state when the amplifier is supplied with one of the shift signals by the shift signal generator and for setting the amplifier in a non-drive state when the amplifier is not supplied with one of the shift signals; and
wherein each of the amplifiers comprises a first transistor element and a second transistor element coupled in series to form a current path between terminals of a predetermined supply voltage, wherein a signal based on the received detection signal is applied to a control terminal of the first transistor element, and wherein the amplified detection signal is outputted from a junction point in the current path of the first transistor element and the second transistor element.

13. The image reading apparatus according to claim 12, wherein each of the amplifiers in the signal driver circuit comprise a source follower amplifier circuit.

14. The image reading apparatus according to claim 12, wherein each of the current controllers further comprises means for applying a signal based on the received shift signal to a control terminal of the second transistor element; and
wherein a signal level of the signal applied to the control terminal of the second transistor element when the amplifier corresponding to the current controller is supplied with one of the shift signals is such that the second transistor element reaches an "ON" state, and the signal level of the signal applied to the control terminal of the second transistor element when the amplifier corresponding to the current controller is not supplied with one of the shift signals is such that the second transistor element reaches an "OFF" state.

15. The image reading apparatus according to claim 12, wherein each of the current controllers further comprises means for controlling a signal level of the signal applied to the control terminal of the first transistor element based on the received shift signal; and
wherein the signal level of the signal applied to the control terminal of the first transistor element when the amplifier corresponding to the current controller is not supplied with one of the shift signals is such that the first transistor element reaches an "OFF" state.

16. The image reading apparatus according to claim 12, wherein each of the current controllers further comprises:
a current control switch coupled in series with the first transistor element and the second transistor element between the terminals of the predetermined supply voltage; and
means for setting the current control switch in an "ON" state when the amplifier corresponding to the current controller is supplied with one of the shift signals and for setting the current control switch in an "OFF" state when the amplifier corresponding to the current controller is not supplied with one of the shift signals.

17. The image reading apparatus according to claim 12, wherein the data converter comprises a plurality of output control switches respectively corresponding to the plurality of amplifiers for outputting the amplified detection signals in synchronization with the amplifiers.

18. An image reading apparatus, comprising:
a photosensor array comprising a plurality of photosensors arrayed in a matrix form;
a scanning driver circuit which outputs a scanning signal for simultaneously setting in a selective state the plurality of photosensors in a row of the photosensor array;
a signal driver circuit which reads out in parallel a plurality of detection signals corresponding to a detectable object image placed upon the photosensor array from each of the photosensors set in the selective state by the scanning driver circuit;
wherein the signal driver circuit comprises:
a shift signal generator for sequentially outputting shift signals at a predetermined time interval;
a data converter corresponding to each of the plurality of detection signals and respectively receiving the shift signals, wherein the detection signals are outputted in time series based on an output timing of each of the shift signals;
an amplifier for receiving each of the detection signals in time series from the data converter, and sequentially amplifying each of the detection signals to a predetermined signal level, wherein the amplifier generates and outputs time series read data; and
a current controller for controlling a supply state of electrical current to the amplifier corresponding to a timing of the detection signals outputted in time series;
wherein the amplifier comprises a first transistor element and a second transistor element coupled in series to form a current path between terminals of a predetermined supply voltage;
wherein the detection signals outputted in time series are applied to a control terminal of the first transistor element, and the read data is outputted from a junction point in the current path of the first transistor element and the second transistor element; and
wherein the current controller performs control such that a signal level of a signal applied to a control terminal of the second transistor element is such that the second transistor element reaches an "OFF" state at a timing between each of the detection signals outputted in time series.

19. The image reading apparatus according to claim 18, wherein the amplifier in the signal driver circuit comprises a source follower amplifier circuit.

20. The image reading apparatus according to claim 18, further comprising signal resetting means for initializing a signal level of a signal applied to the amplifier at the timing between each of the detection signals.

21. An image reading apparatus, comprising:
a photosensor array comprising a plurality of photosensors arrayed in a matrix form;
a scanning driver circuit which outputs a scanning signal for simultaneously setting in a selective state the plurality of photosensors in a row of the photosensor array;
a signal driver circuit which reads out in parallel a plurality of detection signals corresponding to a detectable object image placed upon the photosensor array from each of the photosensors set in the selective state by the scanning driver circuit;
wherein the signal driver circuit comprises:
a shift signal generator for sequentially outputting shift signals at a predetermined time interval;
a data converter corresponding to each of the plurality of detection signals and respectively receiving the shift signals, wherein the detection signals are outputted in time series based on an output timing of each of the shift signals;
an amplifier for receiving each of the detection signals in time series from the data converter, and sequentially amplifying each of the detection signals to a predetermined signal level, wherein the amplifier generates and outputs time series read data;
a current controller for controlling a supply state of electrical current to the amplifier corresponding to a timing of the detection signals outputted in time series; and
signal resetting means for initializing a signal level of a signal applied to the amplifier at a timing between each of the detection signals;
wherein the amplifier comprises a first transistor element and a second transistor element coupled in series to form a current path between terminals of a predetermined supply voltage;
wherein the detection signals outputted in time series are applied to a control terminal of the first transistor element, and the read data is outputted from a junction point in the current path of the first transistor element and the second transistor element; and
wherein the signal resetting means comprises means in for setting the signal level of the signal applied to the amplifier, which is applied to the control terminal of the first transistor element, is such that a predetermined reset voltage of the first transistor element reaches an "OFF" state at timing between each of the detection signals.

* * * * *